US008867546B2

(12) United States Patent
Kubota

(10) Patent No.: US 8,867,546 B2
(45) Date of Patent: Oct. 21, 2014

(54) COMMUNICATION PATH CONTROL TECHNIQUE

(71) Applicant: Fujitsu Limited, Kawasaki (JP)

(72) Inventor: Makoto Kubota, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 160 days.

(21) Appl. No.: 13/713,040

(22) Filed: Dec. 13, 2012

(65) Prior Publication Data

US 2013/0243000 A1 Sep. 19, 2013

(30) Foreign Application Priority Data

Mar. 14, 2012 (JP) ................................. 2012-056820

(51) Int. Cl.
*H04L 12/28* (2006.01)
(52) U.S. Cl.
USPC ............................ 370/392; 370/400; 370/410
(58) Field of Classification Search
USPC ......... 370/230, 235, 238, 389, 392, 400, 401, 370/410
See application file for complete search history.

(56) References Cited

U.S. PATENT DOCUMENTS

| 7,706,292 | B2 | 4/2010 | Nakano et al. | |
| 2004/0071080 | A1* | 4/2004 | Uchiyama et al. | 370/225 |
| 2006/0203720 | A1* | 9/2006 | Kano | 370/228 |
| 2006/0250951 | A1* | 11/2006 | Ueda et al. | 370/217 |
| 2007/0058568 | A1* | 3/2007 | Previdi et al. | 370/254 |
| 2008/0046597 | A1* | 2/2008 | Stademann et al. | 709/249 |
| 2009/0201932 | A1* | 8/2009 | Kumar et al. | 370/395.5 |
| 2011/0292940 | A1* | 12/2011 | Okamoto | 370/392 |
| 2012/0140679 | A1* | 6/2012 | Inaba et al. | 370/258 |
| 2013/0258842 | A1* | 10/2013 | Mizutani | 370/228 |
| 2014/0010233 | A1* | 1/2014 | Takase et al. | 370/392 |
| 2014/0146828 | A1* | 5/2014 | Kini et al. | 370/401 |

FOREIGN PATENT DOCUMENTS

| JP | 2008-131240 | 6/2008 |
| JP | 2008-153727 | 7/2008 |

* cited by examiner

*Primary Examiner* — Andrew Lee
(74) *Attorney, Agent, or Firm* — Fujitsu Patent Center

(57) ABSTRACT

Upon receipt of a change request to change a path in a first communication and including a label assigned to a path after change and information of a transfer destination after change, a relay apparatus stores the label assigned to the path after change in association with the information of the transfer destination after change into a first storage unit. The relay apparatus then updates a second storage unit so as to change a first label assigned to a path before change in the first communication to the label assigned to the path after change. Upon determining that response messages for a request message transferred on the path before change have been received without omission with respect to the first communication, the relay apparatus deletes the first label assigned to the path before change and information of a transfer destination corresponding to the first label from the first storage unit.

17 Claims, 32 Drawing Sheets

| TRANSFER DESTINATION | INFORMATION |
|---|---|
| RELAY APPARATUS 12 | IP ADDRESS 1, Port2 |

FIG.9

| TRANSFER DESTINATION | INFORMATION |
|---|---|
| RELAY APPARATUS 13 | IP ADDRESS3, Port3 |

FIG.10

| HOST | INFORMATION |
|---|---|
| test.com | 5.5.5.5 |

FIG.11

| LABEL | TRANSFER DESTINATION LIST | TRANSFER MODE |
|---|---|---|
| label3 | RELAY APPARATUS 12 | ENTRANCE |

FIG.12

| LABEL | TRANSFER DESTINATION LIST | TRANSFER MODE |
|---|---|---|
| label3 | INSERTION APPLICATION 211, RELAY APPARATUS 13 | MIDWAY |

FIG.13

| LABEL | TRANSFER DESTINATION LIST | TRANSFER MODE |
|---|---|---|
| label3 | BUSINESS APPLICATION | EXIT |

FIG.14

| ENTRY NO. | SOCKET FOR APPLICATION SERVER | SOCKET FOR CLIENT TERMINAL | LABEL | TRANSFER MODE |
|---|---|---|---|---|
| 1 | Socket2 | Socket1 | label3 | ENTRANCE |
| ⋮ | ⋮ | ⋮ | ⋮ | ⋮ |

FIG.15

| ENTRY NO. | SOCKET FOR APPLICATION SERVER | SOCKET FOR CLIENT TERMINAL | LABEL | TRANSFER MODE |
|---|---|---|---|---|
| 1 | Socket4 | Socket3 | label3 | MIDWAY |
| ⋮ | ⋮ | ⋮ | ⋮ | ⋮ |

FIG.16

| ENTRY NO. | SOCKET FOR APPLICATION SERVER | SOCKET FOR CLIENT TERMINAL | LABEL | TRANSFER MODE |
|---|---|---|---|---|
| 1 | Socket6 | Socket5 | label3 | EXIT |
| ⋮ | ⋮ | ⋮ | ⋮ | ⋮ |

FIG.17

| ENTRY NO. | SOCKET FOR APPLICATION SERVER | SOCKET FOR CLIENT TERMINAL | URL IN REQUEST MESSAGE |
|---|---|---|---|
| 1 | Socket8 | Socket7 | URL-A |
| ⋮ | ⋮ | ⋮ | ⋮ |

FIG.18

| FLOW ID | PATH STATUS |
|---|---|
| flow1 | IN NORMAL OPERATION |
| ⋮ | ⋮ |

FIG.19

| LABEL | ENTRY NO. LIST | FLOW ID | PATH STATUS |
|---|---|---|---|
| label3 | #1, ... | flow1 | IN NORMAL OPERATION |

FIG.20

| FLOW ID | LABEL |
|---|---|
| flow1 | label3 |

FIG.21

| USER ID, OS TYPE | FLOW ID |
|---|---|
| user01, Win2000 | flow1 |

FIG.22

| APPROVED AUTHENTICATION HEADER | USER ID |
|---|---|
| 7failkuouf | user01 |

FIG.23

| User-Agent | OS TYPE |
|---|---|
| MSIE 6.0; Windows 2000 | Win2000 |
| ⋮ | ⋮ |

FIG.24

| EXTRACTED PARAMETER | STORAGE POSITION OF PARAMETER |
|---|---|
| USER ID IDENTIFICATION KEY | Proxy-Authorization FIELD |
| User-Agent | User-Agent FIELD |

FIG.25

| TRANSMISSION SOURCE IP ADDRESS | PRECEDING NODE |
|---|---|
| \*\*.\*\*.\*\*.\*\* | INSERTION APPLICATION 211 |

FIG.26

```
GET http://test.com/ HTTP/1.1
User-Agent: MSIE 6.0; Windows 2000
Host: test.com
Proxy-Connection: keep-alive
```

FIG.30

```
HTTP/1.1 407 Proxy Authentication Required
Proxy-Connection: keep-alive, timeout=50, maxreq=60
Proxy-Authenticate: Basic Realm="proxy"
Not Authorized: GET http://test.com/ HTTP/1.1
<BR>
<B>Proxy Authorization</B> required.<P>
```

FIG.31

```
GET http://test.com/ HTTP/1.1
User-Agent: MSIE 6.0; Windows 2000
Host: test.com
Proxy-Connection: keep-alive
Proxy-Authorization: Basic 7fajlkuouf
```

FIG.32

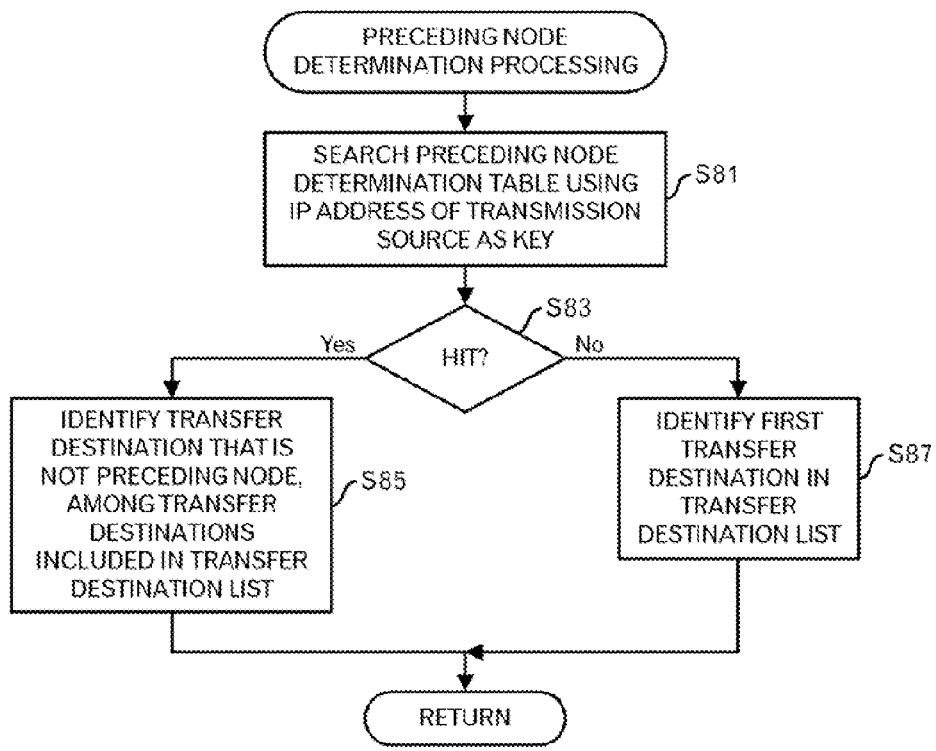

1. RELAY APPARATUS 11
2. RELAY APPARATUS 14 {
    1. INSERTION APPLICATION 22
   }
3. RELAY APPARATUS 13

| LABEL | NO. OF REQUEST MESSAGES | NO. OF RESPONSE MESSAGES |
|---|---|---|
| label3 | 2 | 1 |

COMMUNICATION PATH CONTROL TECHNIQUE

CROSS-REFERENCE TO RELATED APPLICATIONS

This application is based upon and claims the benefit of priority of the prior Japanese Patent Application No. 2012-056820, filed on Mar. 14, 2012, the entire contents of which are incorporated herein by reference.

FIELD

This technology relates to a technology for controlling communication paths.

BACKGROUND

Known technologies related to the control of communication paths include MultiProtocol Label Switching-Traffic Engineering (MPLS-TE).

Referring to FIGS. 1A and 1B, a change of the communication path using MPLS-TE will be described. In changing the path using MPLS-TE, settings of a new path are previously made in each of relay apparatuses (e.g. routers) in an MPLS network, apart from settings of the old path. In FIG. 1A, upper tables illustrates settings of an old path, and lower tables illustrates settings of a new path, which are made apart from the settings of the old path. From a certain point in time on and after the settings were made, a relay apparatus serving as the entrance of the new path changes a label to be attached to a packet received from a client terminal, from an old label to a new label. In FIGS. 1A and 1B, a relay apparatus 1 changes a label to be attached to a packet, from "label 3" to "label 4". Thus, each relay apparatus can transfer the packet along the new path using the corresponding lower table.

However, MPLS-TE is a technology for packet communication, and it is not assumed that MPLS-TE is applied to communications using the Hyper Text Transfer Protocol (HTTP) or the like. Accordingly, if the path of a request message and the path of a response message are required to be the same in communications using HTTP or the like, it is not appropriate to change the path by using a technology such as MPLS-TE as it is. This is because using a technology such as MPLS-TE as it is may cause a situation where while a request message is transferred along the old path, a response message is transferred along the new path.

There has been a technology by which plural relay apparatuses collaborate to calculate delay time for each priority and delay time for each path and to change the path on the basis of the delay time. However, the above-mentioned problem is not considered even in this conventional technology. The timing when the resources associated with the old path are deleted is not considered, either.

There is also a technology of previously setting a time limit to a path which will go out of use and deleting information on that path when the time limit expires. However, this technology has a problem that a failure to properly set a time limit would increase the time over which the relay apparatus manages both the resources associated with the old path and those associated with the new path and thus the load on the relay apparatus would be increased.

As seen, in changing the path in communications where the path of the request message and the path of the response message are required to be the same, sufficient consideration is not given to when the resources associated with the old path would be deleted.

In other words, the conventional technique cannot early release resources associated with the path before the change, when changing the path or route in the communication where the path or route of the request message and the path or route of the response message are required to be the same.

SUMMARY

A relay apparatus according to a first aspect of this technology includes: (A) a first data storage unit storing identification information of a communication in association with a label that is assigned to a path in the communication; (B) a second data storage unit storing a label in association with information of a transfer destination; (C) a storing processing unit that, upon receipt of a change request that is a request to change a path in a first communication and includes a label assigned to a path after the change and information of a transfer destination after the change from a computer managing a communication path, stores the label assigned to the path after the change in association with the information of the transfer destination after the change into the second data storage unit; (D) an update unit that updates the first data storage unit so as to change a first label assigned to a path before the change in the first communication to the label assigned to the path after the change; and (E) a deletion unit that, upon determining that response messages for a request message transferred on the path before the change have been received without omission with respect to the first communication, deletes the first label assigned to the path before the change and information of a transfer destination corresponding to the first label from the second data storage unit.

A path control apparatus according to a second aspect of this technology includes: (F) a first transmission unit that, upon accepting an input of information of a path after change in a first communication, transmits a label assigned to the path after the change and information of a transfer destination after the change to relay apparatuses on the path after the change; (G) a second transmission unit that transmits a determination request to determine whether or not response messages for a request message transferred on a path before the change have been received without omission to a first relay apparatus that is a relay apparatus nearest to an apparatus that is a transmission source of the request message among the relay apparatuses on the path after the change; and (H) a third transmission unit that, upon receipt of first data representing the response messages for the request message transferred on the path before the change have been received without omission from the first relay apparatus, transmits a deletion request to request deletion of data concerning resources associated with a label assigned to the path before the change in the first communication to at least the first relay apparatus.

An information processing system according to a third aspect of this technology includes: (I) a relay apparatus; and (J) a path control apparatus managing a communication path. The aforementioned relay apparatus includes: (i1) a first data storage unit storing identification information of a communication in association with a label that is assigned to a path in the communication; (i2) a second data storage unit storing a label in association with information of a transfer destination; and (i3) a processing unit. Then, upon accepting an input of information of a path after change in a first communication, the path control apparatus transmits a change request that includes a label assigned to the path after the change and information of a transfer destination after the change to at least the relay apparatus. Moreover, upon receipt of the change request from the path control apparatus, the processing unit of the relay apparatus carries out a processing to store the label assigned to the path after the change in association with the information of the transfer destination after the change into the second data storage unit, and transmits data representing that the processing to store has been completed to the path control apparatus. Upon receipt of the data representing that the processing to store has been completed from at least the relay apparatus, the path control apparatus transmits a path change request including identification information of the first communication, a label assigned to a path before the change in the first communication and a label assigned to the path after the change in the first communication to at least the relay apparatus. Upon receipt of the path change request from the path control apparatus, the processing unit of the relay apparatus updates the first data storage unit so as to change the label assigned to the path before the change in the first communication to the label assigned to the path after the change. Upon determining that response messages for a request message transferred on the path before the change have been received without omission with respect to the first communication, the processing unit of the relay apparatus transmits disuse notification representing disuse of the path before the change to the path control apparatus. Upon receipt of the disuse notification, the path control apparatus transmits a deletion request to request deletion of data concerning resources associated with the label assigned to the path before the change in the first communication to at least the relay apparatus. Upon receipt of the deletion request, the processing unit of the relay apparatus deletes the label assigned to the path before the change in the first communication and information of a transfer destination corresponding to the label assigned to the path before the change from the second data storage unit.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

BRIEF DESCRIPTION OF DRAWINGS

FIG. 9 is a diagram depicting an example of data stored in an address resolution table in the entrance relay apparatus;

FIG. 10 is a diagram depicting an example of data stored in an address resolution table in the midway relay apparatus;

FIG. 11 is a diagram depicting an example of data stored in an address resolution table in the exit relay apparatus;

FIG. 12 is a diagram depicting an example of data stored in a transfer table in the entrance relay apparatus;

FIG. 13 is a diagram depicting an example of data stored in a transfer table in the midway relay apparatus;

FIG. 14 is a diagram depicting an example of data stored in a transfer table in the exit relay apparatus;

FIG. 15 is a diagram depicting an example of data stored in a socket association table in the entrance relay apparatus;

FIG. 16 is a diagram depicting an example of data stored in a socket association table in the midway relay apparatus;

FIG. 17 is a diagram depicting an example of data stored in a socket association table in the exit relay apparatus;

FIG. 18 is a diagram depicting an example of data stored in a socket association table in the insertion server;

FIG. 19 is a diagram depicting an example of data stored in a status management table in the control server;

FIG. 20 is a diagram depicting an example of data stored in a status management table in the entrance relay apparatus;

FIG. 21 is a diagram depicting an example of data stored in a label table in the entrance relay apparatus;

FIG. 22 is a diagram depicting an example of data stored in a flow identification table in the entrance relay apparatus;

FIG. 23 is a diagram depicting an example of data stored in an authentication cache table in the entrance relay apparatus;

FIG. 24 is a diagram depicting an example of data stored in an OS determination table in the entrance relay apparatus;

FIG. 25 is a diagram depicting an example of data stored in an extraction table in the entrance relay apparatus;

FIG. 26 is a diagram depicting an example of data stored in a preceding node determination table in the entrance relay apparatus;

FIG. 30 is a diagram depicting an example of a request message that does not include an authentication header;

FIG. 31 is a diagram depicting an example of a message to request the authentication header;

FIG. 32 is a diagram depicting an example of a request message that includes an authentication header;

FIG. 33 is a diagram depicting an example of data stored in the authentication cache table;

FIG. 34 is a diagram depicting an example of a preceding node determination processing;

FIG. 36 is a diagram depicting an example of a request message transferred from the entrance relay apparatus to the midway relay apparatus;

DESCRIPTION OF EMBODIMENTS

First Embodiment

Figure 1A:
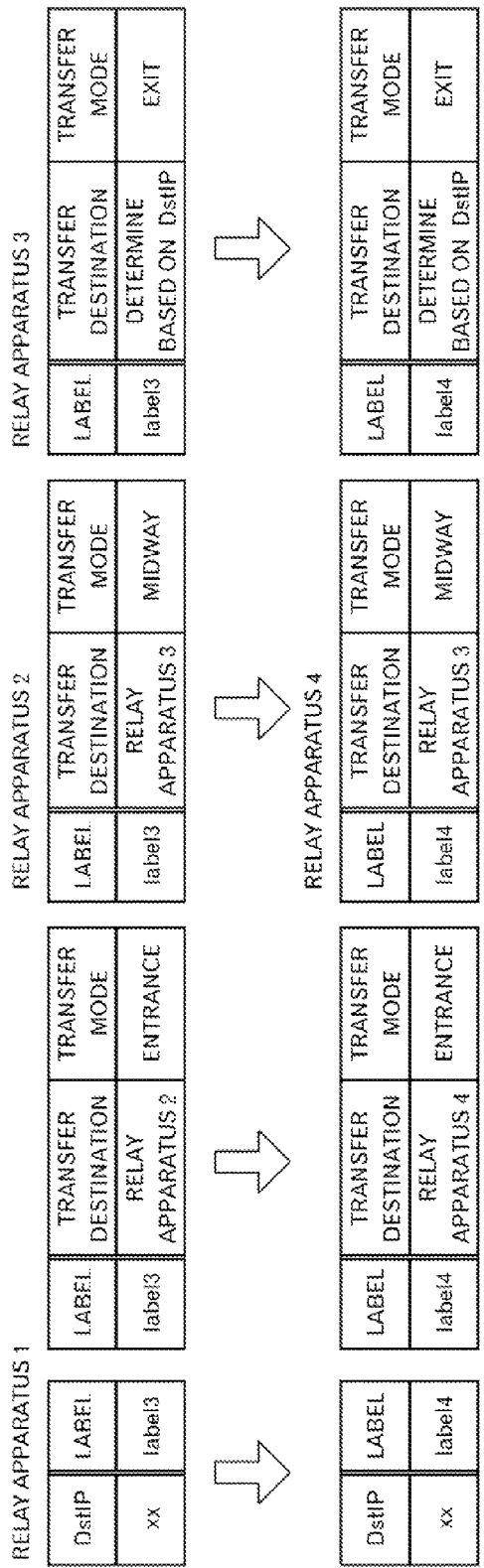
FIGS. 1A and 1B are diagrams to explain MPLS-TE.
Figure 1B:
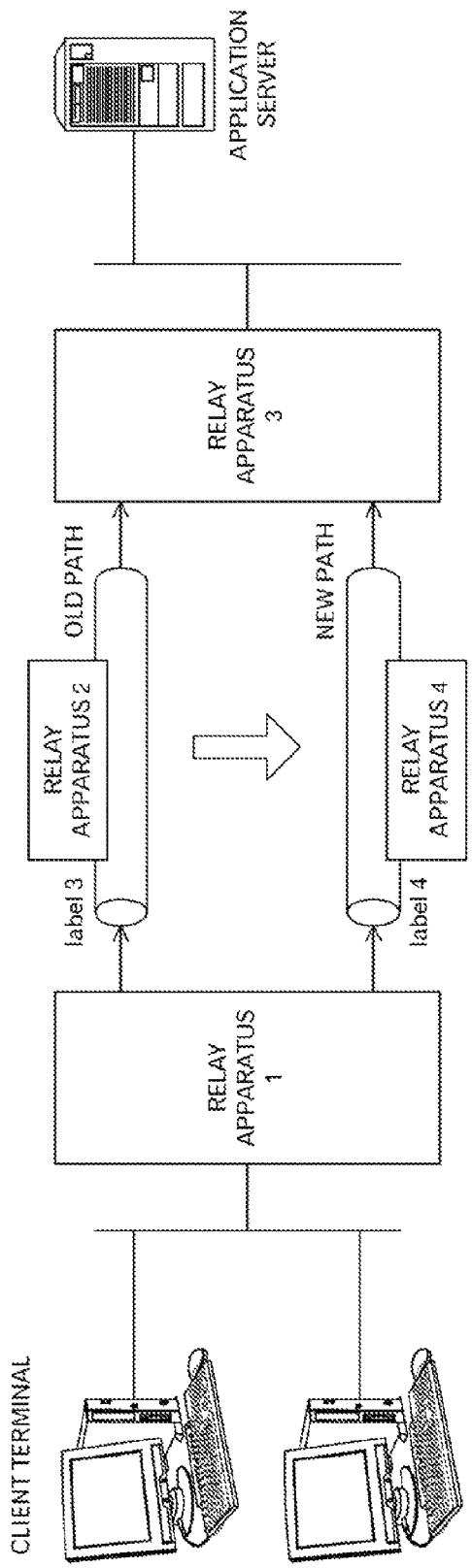
Figure 2:
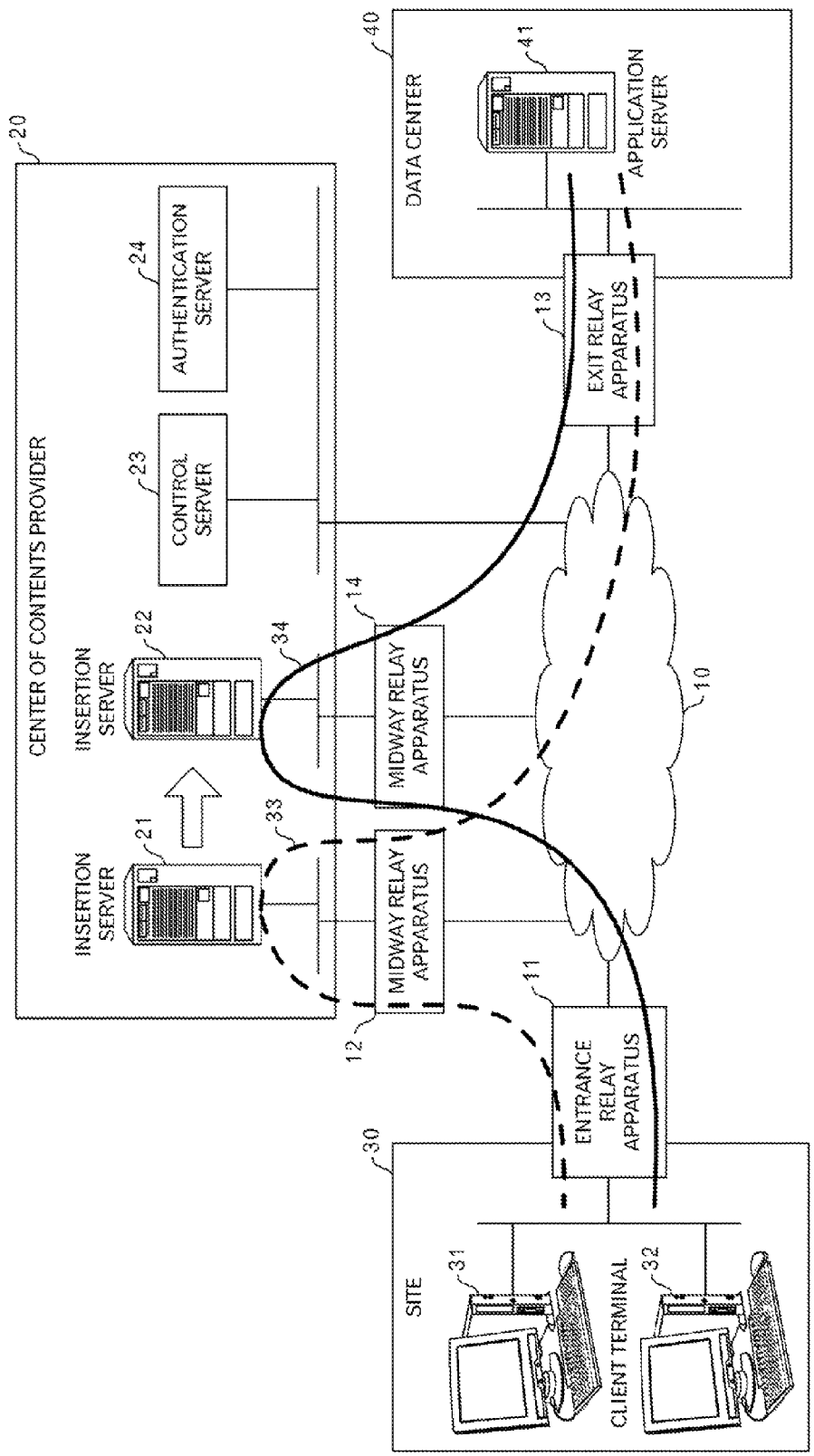
FIG. 2 is a diagram depicting an outline of a system relating to a first embodiment.

FIG. 2 illustrates an outline of a system according to a first embodiment. For example, client terminals 31 and 32 having a client application installed thereon are disposed at a site 30 of a corporation or the like. The client terminals 31 and 32 are connected to an entrance relay apparatus 11 via a local area network (LAN) or the like. The number of client terminals is not limited.

The entrance relay apparatus 11 is connected to a network 10, such as a Wide Area Network (WAN). Also connected to the network 10 are midway relay apparatuses 12 and 14 and an exit relay apparatus 13. Further, a control server 23 and an authentication server 24 are connected to the network 10 via a network, such as a LAN, a relay apparatus in the figure (e.g. router), or the like.

Insertion servers 21 and 22 are connected to the midway relay apparatuses 12 and 14, respectively. The insertion servers 21 and 22 respectively have an insertion application installed thereon. In this embodiment, it is assumed that the respective insertion applications installed on the insertion servers 21 and 22 differ from each other. Connected to the exit relay apparatus 13 is an application server 41 which is disposed in a data center 40 and has a business application installed thereon.

The client application installed on the client terminals 31 and 32 and the business application installed on the application server 41 communicate with each other, for example, using HTTP. Disposed on the communication path between the client application and the business application are the insertion servers 21 and 22 having the insertion applications installed thereon. The insertion servers 21 and 22 perform a processing using a request message transmitted by the client terminal 31 or client terminal 32 and a response message transmitted by the application server 41. For example, the insertion application is a security monitoring application that warns the administrator or the like using an email or the like when detecting an abnormality. It is assumed that the insertion applications cannot properly perform a processing unless both a request message and a response message thereto are provided. For this reason, the path of the request message and the path of the response message are required to be the same.

Now, it is assumed that the communication path between the client application installed on the client terminals 31 and 32 and the business application installed on the application server 41 is changed. Specifically, it is assumed that a path "client terminal 31->entrance relay apparatus 11->midway relay apparatus 12->insertion server 21->midway relay apparatus 12->exit relay apparatus 13->application server 41" (a path 33 illustrated by a thick, dotted line in FIG. 2) is changed to a path "client terminal 31->entrance relay apparatus 11->midway relay apparatus 14->insertion server 22->midway relay apparatus 14->exit relay apparatus 13->application server 41" (a path 34 depicted by a thick line in FIG. 2). That is, a change of the communication path results in a change of the insertion application through which messages pass. In this case, it is requested that a situation does not occur in which, while the path of a request message is the path 33, the path of a response message is the path 34, when changing the path.

When the path of the request message and the path of the response message are required to be the same, as described above, it is not appropriate to change the path by using a technology such as MPLS-TE as it is. The reason is that MPLS-TE, which is a technology for packet communications and is assumed to be applied to a one-way flow, may cause a situation in which while a request message is transferred along the old path, a response message is transferred along the new path.

Further, in communications which are assumed in MPLS-TE, it is possible to easily estimate the time when a transferred packet reaches a relay apparatus at the exit of the MPLS network. Accordingly, by changing the old path to the new path, then estimating the time when the packet reaches the relay apparatus at the exit of the MPLS network, and releasing the resources related to the old path (e.g., deleting data related to the old label) on the basis of the estimation, the resources of the relay apparatuses might be efficiently used.

Figure 3:
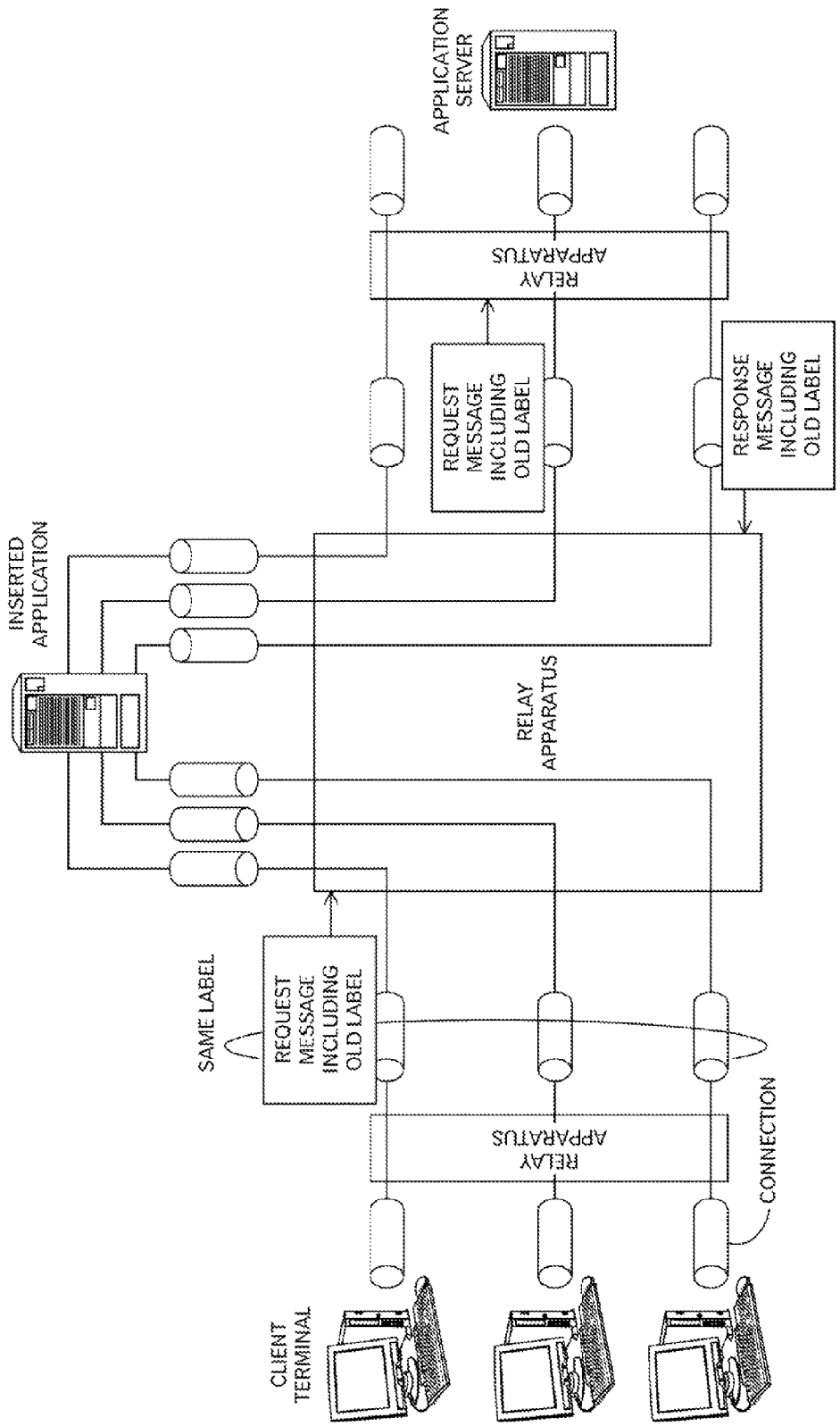
FIG. 3 is a diagram to explain a problem assumed in a system utilizing an insertion application.

For communications in the system illustrated in FIG. 2, on the other hand, the time taken from the transfer of a request message to the return of a response message significantly varies according to the statuses of the insertion applications, the status of the business application on the application server, or the like. In a system as described above, as illustrated in FIG. 3, plural messages with the same label are transferred using plural connections at independent timings. For this reason, each relay apparatus does not know when a response message to a request message that has been transferred along the old path will return and has difficulty in determining the timing when the resources related to the old path could be released.

In view of the foregoing, by using a method described below, the path of a request message and the path of a response message are made to be the same even when the path is changed, and the resources related to the old path can be freed earlier.

Figure 4:
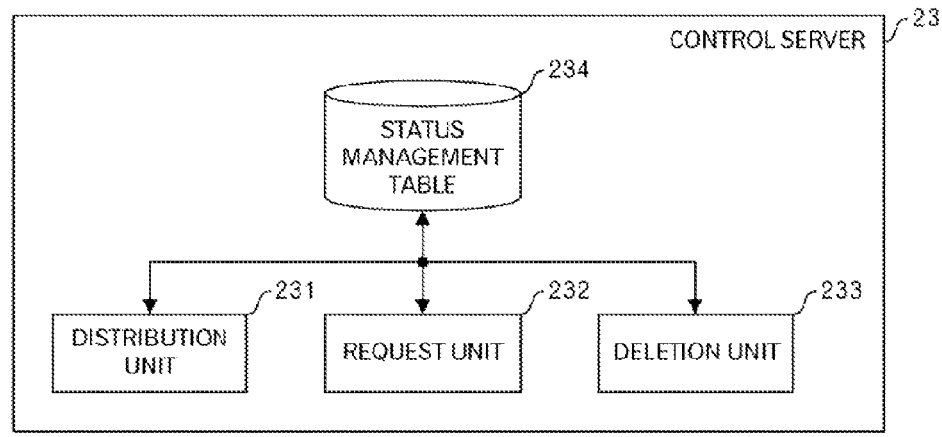
FIG. 4 is a functional block diagram of a control server.

FIG. 4 depicts a functional block diagram of the control server 23. The control server 23 includes a distribution unit 231, a request unit 232, a deletion unit 233, and a status management table 234.

The distribution unit 231 transmits information regarding a label and a transfer destination of a request message and the like to the relay apparatuses on a new path to which the label is assigned. Upon receipt of notifications representing the completion of registration from all the relay apparatuses on the new path, the request unit 232 transmits a request to enable the new path, to a relay apparatus at the entrance of the network 10 on the new path (in this embodiment, the entrance relay apparatus 11). The request unit 232 also sets as a status corresponding to a flow whose path is to be changed, "wait for detection of disuse" in the status management table 234. The deletion unit 233 transmits a request to delete the old path, to the relay apparatuses on the old path and sets as a status corresponding to a flow whose path is to be changed, "in normal operation" in the status management table 234.

Figure 5:
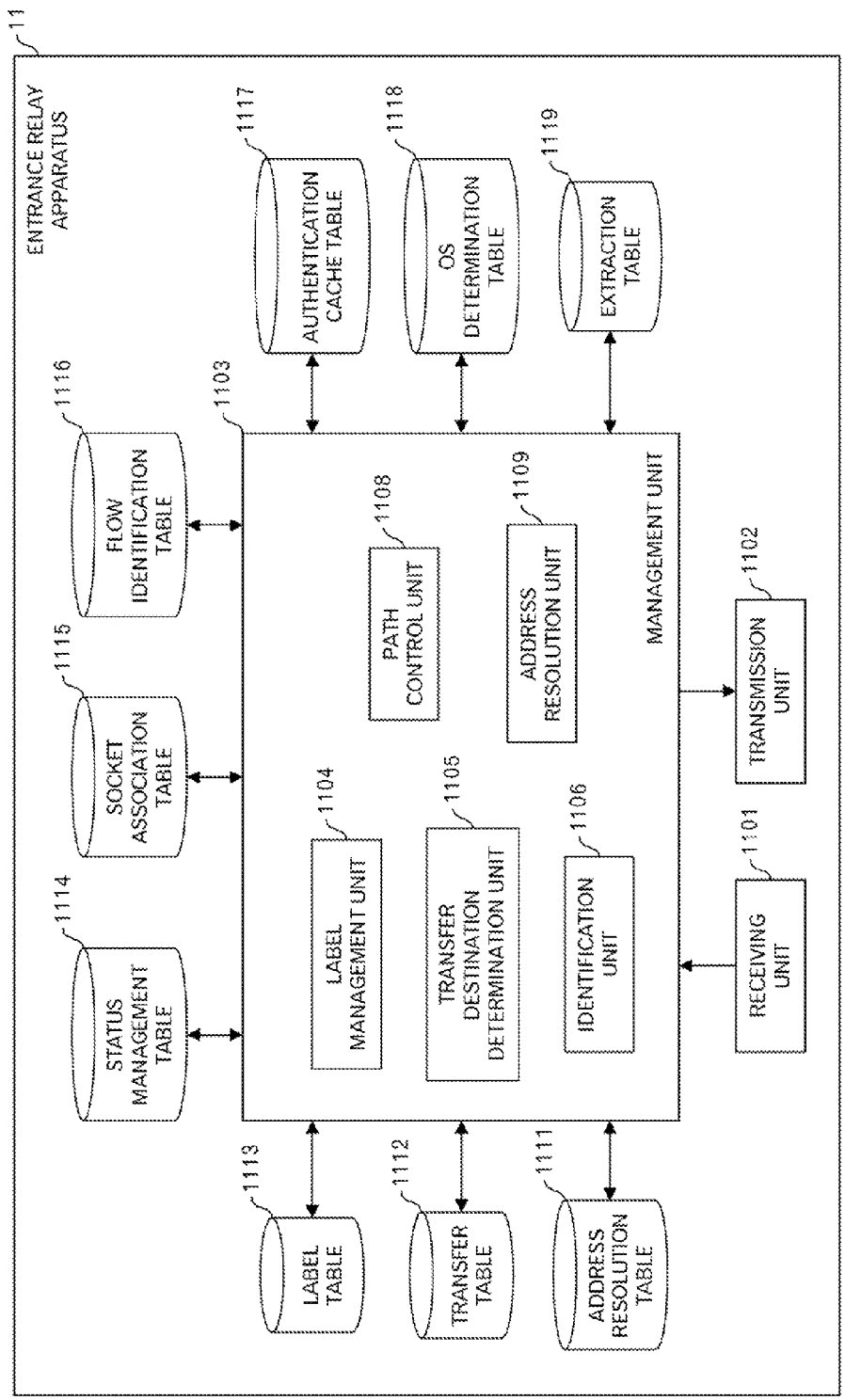
FIG. 5 is a functional block diagram of an entrance relay apparatus.

FIG. 5 illustrates a functional block diagram of the entrance relay apparatus 11. The entrance relay apparatus 11 includes a receiving unit 1101, a transmission unit 1102, and a management unit 1103 including a label management unit 1104, a transfer destination determination unit 1105, an identification unit 1106, a path control unit 1108, and an address resolution unit 1109. The entrance relay apparatus 11 also has an address resolution table 1111, a transfer table 1112, a label table 1113, a status management table 1114, a socket association table 1115, a flow identification table 1116, an authentication cache table 1117, an operating system (OS) determination table 1118, and an extraction table 1119.

The receiving unit 1101 outputs a received message to the management unit 1103. The transmission unit 1102 transmits the message received from the management unit 1103 to another relay apparatus or the like. The label management unit 1104 manages data stored in the label table 1113. The transfer destination determination unit 1105 determines the transfer destination using data stored in the transfer table 1112. The identification unit 1106 determines whether the received message is a request message or response message. The identification unit 1106 also identifies a flow ID by performing a processing using data stored in the flow identification table 1116, data stored in the authentication cache table 1117, data stored in the OS determination table 1118, and data stored in the extraction table 1119. The path control unit 1108 performs a processing such as updating of data stored in the socket association table 1115 and data stored in the status management table 1114. The address resolution unit 1109 identifies the IP address and port number of the transfer destination using data stored in the address resolution table 1111.

Figure 6:
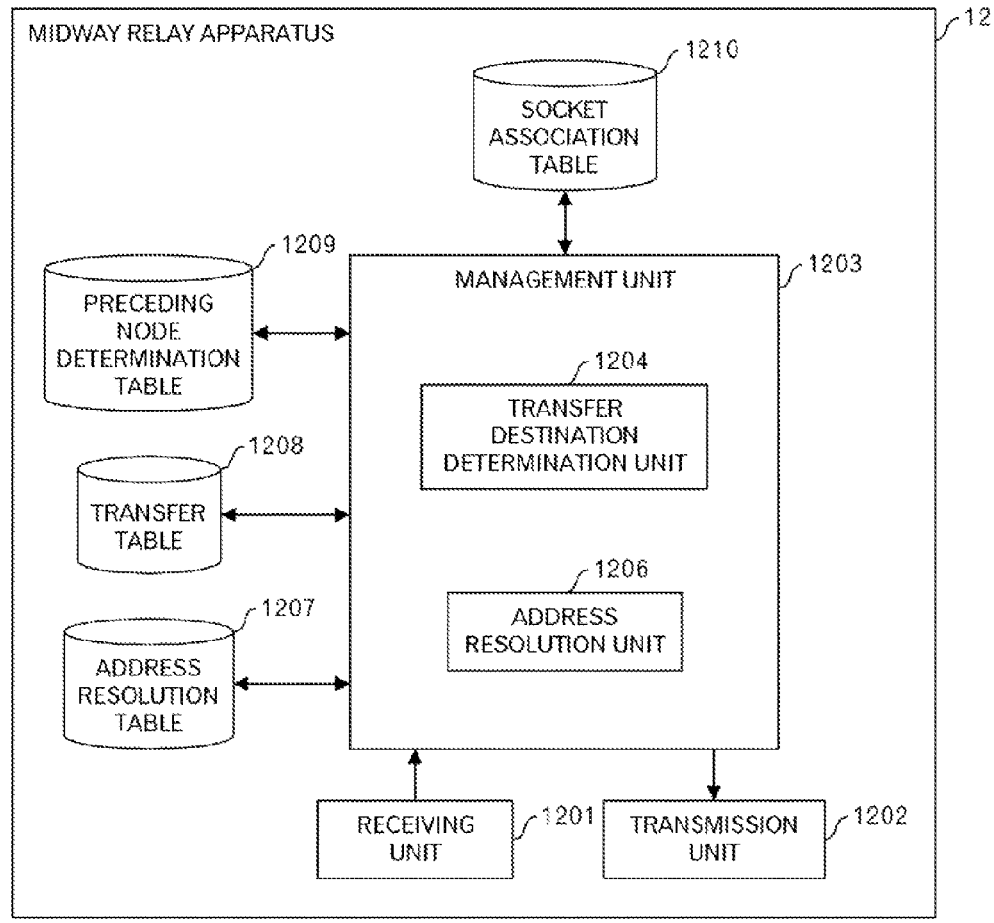
FIG. 6 is a functional block diagram of a midway relay apparatus.

FIG. 6 shows a functional block diagram of the midway relay apparatus 12. The midway relay apparatus 12 includes a receiving unit 1201, a transmission unit 1202, and a management unit 1203 including a transfer destination determination unit 1204 and an address resolution unit 1206. The midway relay apparatus 12 also has an address resolution table 1207, a transfer table 1208, a preceding node determination table 1209, and a socket association table 1210. A functional block diagram of the midway relay apparatus 14 is similar to that of the midway relay apparatus 12.

The receiving unit 1201 outputs a received message to the management unit 1203. The transmission unit 1202 transmits the message received from the management unit 1203 to another relay apparatus or the like. The transfer destination determination unit 1204 determines the transfer destination using data stored in the transfer table 1208 and data stored in the preceding node determination table 1209. The address resolution unit 1206 identifies the IP address and port number of the transfer destination using data stored in the address resolution table 1207.

Figure 7:
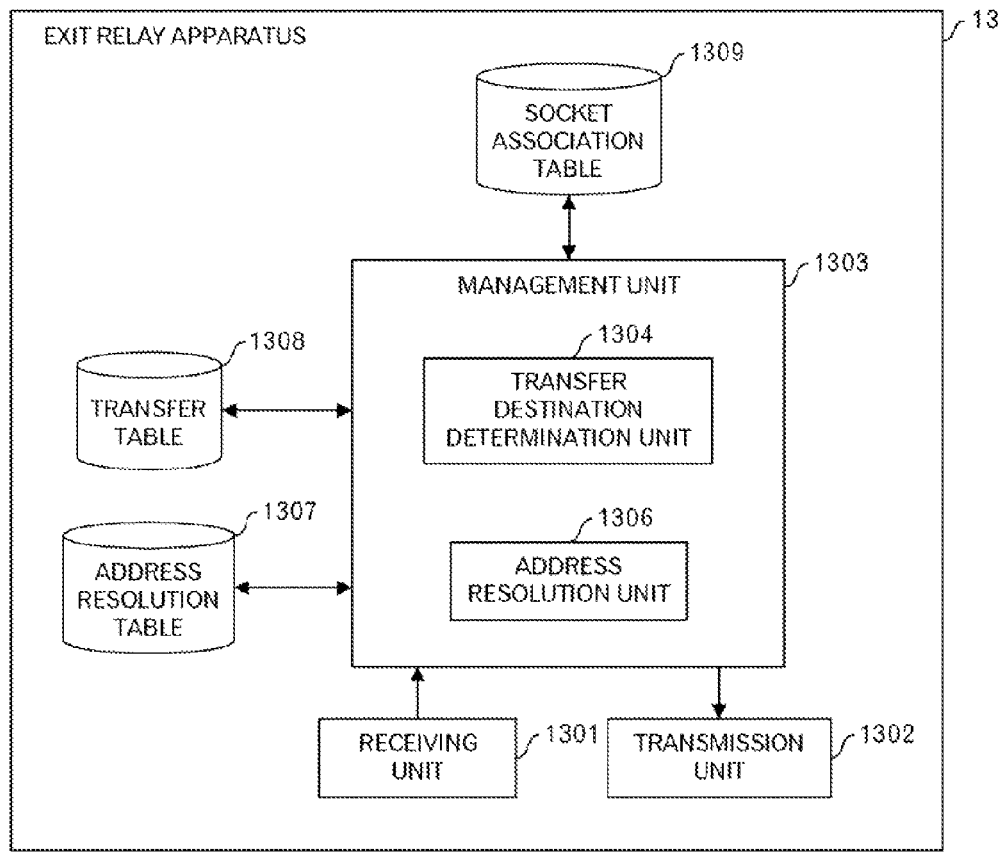
FIG. 7 is a functional block diagram of an exit relay apparatus.

FIG. 7 illustrates a functional block diagram of the exit relay apparatus 13. The exit relay apparatus 13 includes a receiving unit 1301, a transmission unit 1302, and a management unit 1303 including a transfer destination determination unit 1304 and an address resolution unit 1306. The exit relay apparatus 13 also has an address resolution table 1307, a transfer table 1308, and a socket association table 1309.

The receiving unit 1301 outputs a received message to the management unit 1303. The transmission unit 1302 transmits the message received from the management unit 1303 to another relay apparatus or the like. The transfer destination determination unit 1304 determines the transfer destination using data stored in the transfer table 1308. The address resolution unit 1306 identifies the IP address and port number of the transfer destination using data stored in the address resolution table 1307.

Figure 8:
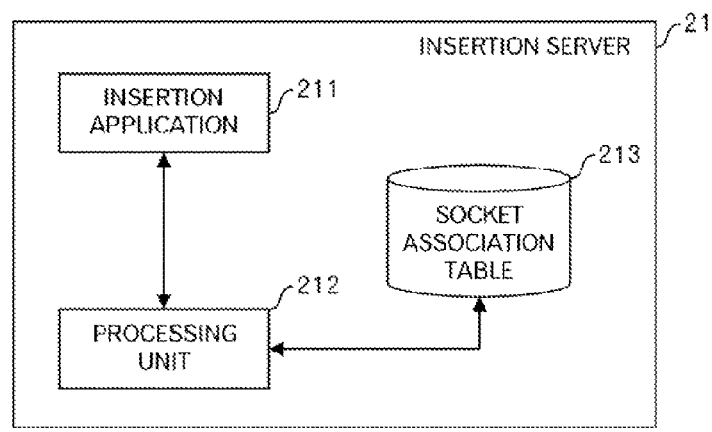
FIG. 8 is a functional block diagram of an insertion server.

FIG. 8 illustrates a functional block diagram of the insertion server 21. The insertion server 21 includes an insertion application 211, a processing unit 212, and a socket association table 213. A functional block diagram of the insertion server 22 is similar to that of the insertion server 21.

The insertion application 211 performs a processing using received request and response messages. The processing unit 212 performs a processing such as identification of the transfer destination socket of the request and response messages using data stored in the socket association table 213.

FIG. 9 illustrates an example of data stored in the address resolution table 1111 of the entrance relay apparatus 11. The ID of the transfer destination and the IP address and port number thereof are stored in the example depicted in FIG. 9.

FIG. 10 illustrates an example of data stored in the address resolution table 1207 of the midway relay apparatus 12. The ID of the transfer destination and the IP address and port number thereof are stored in the example depicted in FIG. 10.

FIG. 11 illustrates an example of data stored in the address resolution table 1307 of the exit relay apparatus 13. A host corresponding to the transfer destination and the IP address of the transfer destination are stored in the example depicted in FIG. 11. A port number may be stored along with the IP address.

FIG. 12 illustrates an example of data stored in the transfer table 1112 of the entrance relay apparatus 11. A label, a transfer destination list, and a transfer mode are stored in the example depicted in FIG. 12. The transfer mode represents the position of this relay apparatus (i.e. node) on a path corresponding to the label.

FIG. 13 illustrates an example of data stored in the transfer table 1208 of the midway relay apparatus 12. A label, a transfer destination list, and a transfer mode are stored in the example depicted in FIG. 13. The IDs of two transfer destinations are registered in the transfer destination list. This means that the midway relay apparatus 12 may transfer a request message to the insertion server 21 or exit relay apparatus 13.

FIG. 14 illustrates an example of data stored in the transfer table 1308 of the exit relay apparatus 13. A label, a transfer destination list, and a transfer mode are stored in the example depicted in FIG. 14.

FIG. 15 depicts an example of data stored in the socket association table 1115 of the entrance relay apparatus 11. Entry numbers, sockets for the application server, sockets for the client terminal, labels, and transfer modes are stored in the example depicted in FIG. 15.

FIG. 16 illustrates an example of data stored in the socket association table 1210 of the midway relay apparatus 12. Entry numbers, sockets for the application server, sockets for the client terminal, labels, and transfer modes are stored in the example depicted in FIG. 16.

FIG. 17 depicts an example of data stored in the socket association table 1309 of the exit relay apparatus 13. Entry numbers, sockets for the application server, sockets for the client terminal, labels, and transfer modes are stored in the example depicted in FIG. 17.

FIG. 18 depicts an example of data stored in the socket association table 213 of the insertion server 21. Entry numbers, sockets for the application server, sockets for the client terminal, and uniform resource locators (URLs) in request messages are stored in the example depicted in FIG. 18.

FIG. 19 illustrates an example of data stored in the status management table 234 of the control server 23. Flow IDs and data representing the statuses of paths are stored in the example depicted in FIG. 19.

FIG. 20 depicts an example of data stored in the status management table 1114 of the entrance relay apparatus 11. A label, an entry number list, a flow ID, and data representing the status of a path are stored in the example depicted in FIG. 20.

FIG. 21 illustrates an example of data stored in the label table 1113 of the entrance relay apparatus 11. A flow ID and a label are stored in the example depicted in FIG. 21.

FIG. 22 depicts an example of data stored in the flow identification table 1116 of the entrance relay apparatus 11. A user ID and an OS type, and a flow ID are stored in the example depicted in FIG. 22.

FIG. 23 depicts an example of data stored in the authentication cache table 1117 of the entrance relay apparatus 11. Information on an approved authentication header, and a user ID are stored in the example depicted in FIG. 23.

FIG. 24 depicts an example of data stored in the OS determination table 1118 of the entrance relay apparatus 11. Information stored in the "User-Agent" field, and an OS type are stored in the example depicted in FIG. 24.

FIG. 25 illustrates an example of data stored in the extraction table 1119 of the entrance relay apparatus 11. Parameters to be extracted and information representing the storage positions of those parameters are stored in the example depicted in FIG. 25.

FIG. 26 illustrates an example of data stored in the preceding node determination table 1209 of the midway relay apparatus 12. The IP address of the transmission source and the ID of the preceding node are stored in the example illustrated in FIG. 26.

In the first embodiment, it is assumed that none of HTTP pipelining and HTTP chunked transfer encoding is performed and that the client terminals 31 and 32 do not transmit the next request message before receiving one response message corresponding to one request message.

Moreover, each relay apparatus and insertion application generate the next connection in such a manner that a connection through which a message was received is maintained as it is (that is, without binding plural connections), and transfer the message.

Previous settings are made as follows. (1) The IP address and port number of the entrance relay apparatus 11 are set as a proxy IP address and port number in the client application (e.g., a WEB browser) on the client terminals 31 and 32. (2) The IP address and port number of the midway relay apparatus 12 are set as the transfer destination IP address and port number of a request message in the insertion application 211 on the insertion server 21. The IP address and port number of the midway relay apparatus 14 are set as the transfer destination IP address and port number of a request message in the insertion application 211 on the insertion server 22. (3) The administrator of the control server 23 inputs a rule for converting a parameter to be extracted and information in the "User-Agent" field into an OS type. The control server 23 transmits the inputted information to the relay apparatuses in the network 10, and causes the relay apparatus to make entries in the respective extraction table 1119 and OS determination table 1118. Note that the control server 23 may transmit the above-mentioned information only to a relay apparatus that may serve as the entrance relay apparatus 11.

Figure 27A:
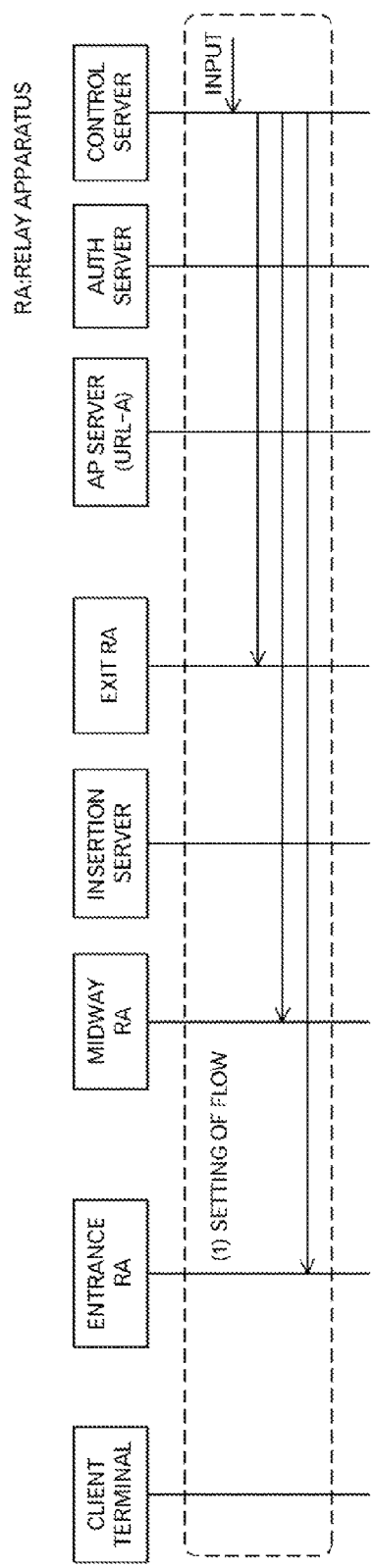
FIGS. 27A, 27B and 27C are sequence diagrams to explain an outline of operations of each node in the system relating to the first embodiment.
Figure 27B:
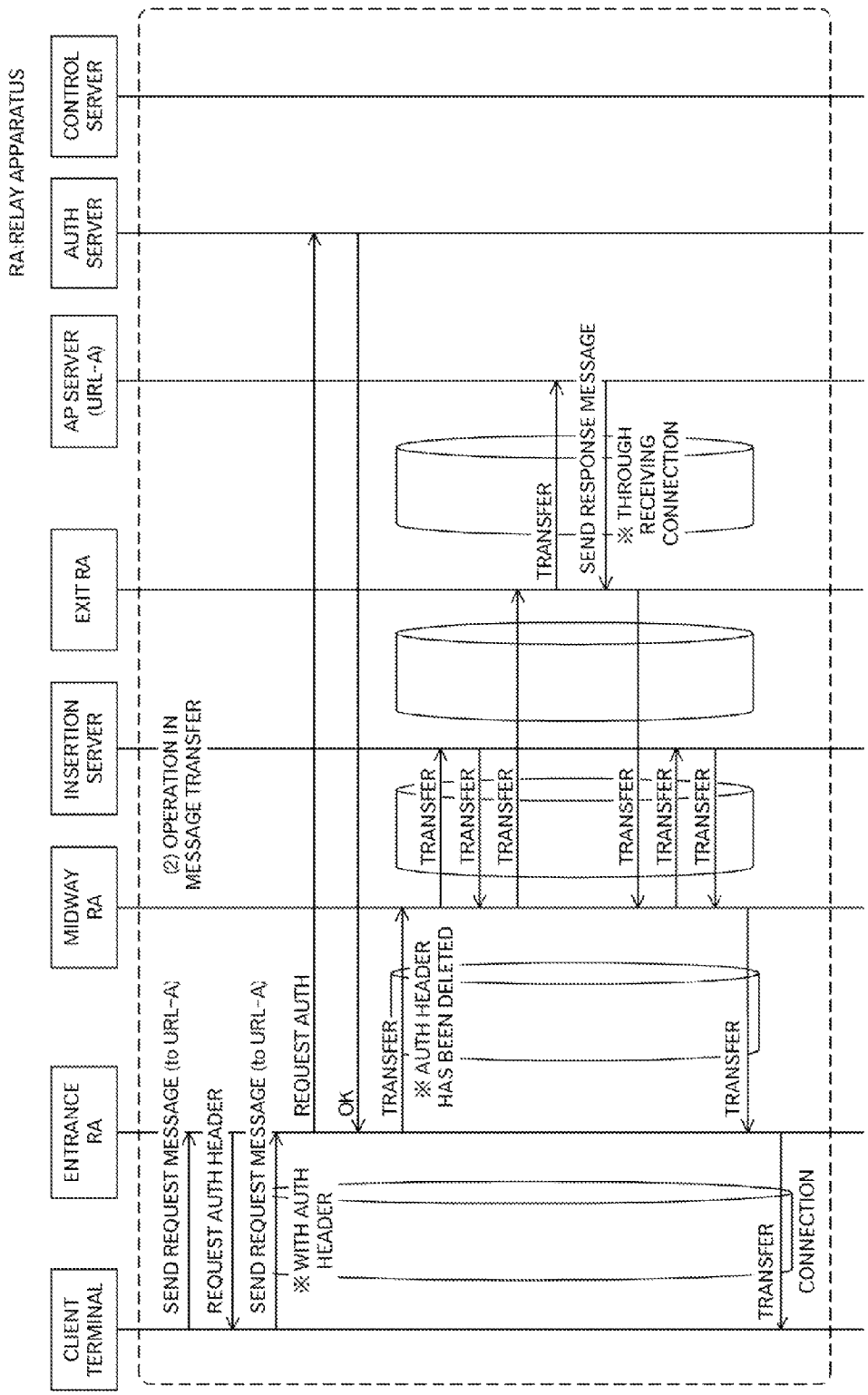
Figure 27C:
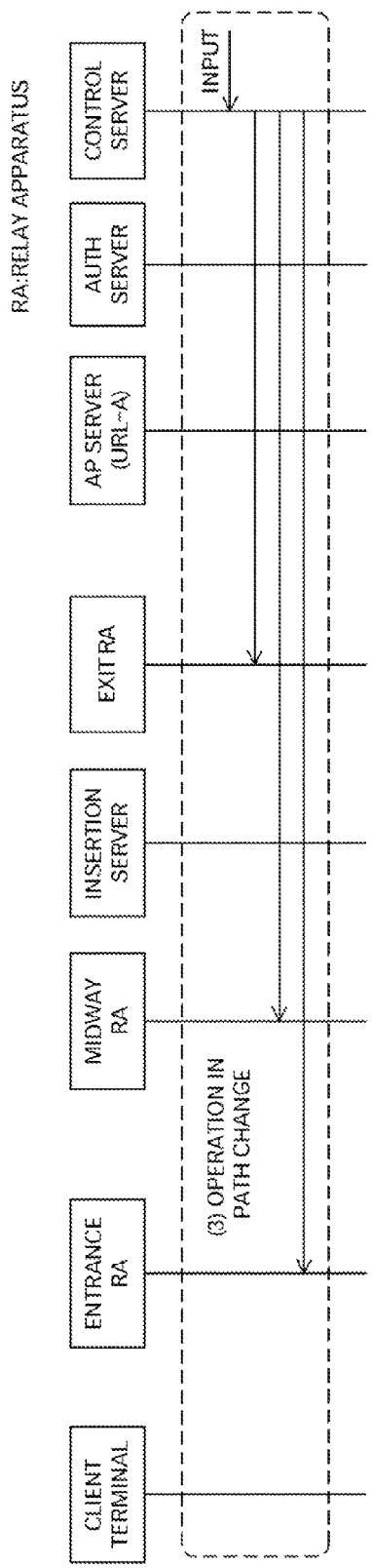

Referring now to a sequence in FIGS. 27A, 27B and 27C, the operations of each node in the system depicted in FIG. 2 will be outlined. The sequence in FIGS. 27A, 27B and 27C is broadly divided into three stages as follows: (1) setting of a flow; (2) transfer of a message; and (3) change of the path. A cylindrical figure represents that connections are established.

In stage (1), the control server 23 accepts an input of information on a flow condition, a path corresponding to the flow, and the like, from the administrator or the like. The control server 23 then transmits the flow condition and the like to the entrance relay apparatus 11, as well as transmits a label to be assigned to the path corresponding to the flow, and the like to the entrance relay apparatus 11, the midway relay apparatus 12, and the exit relay apparatus 13.

The operation of each node during normal message transfer is illustrated in (2). First, the client terminal 31 transmits a request message to "URL-A". Then, the entrance relay apparatus 11 receives the request message. When the received request message does not contain an authentication header, the entrance relay apparatus 11 transmits, to the client terminal 31, a message to request the addition of the authentication header to the request message. When the client terminal 31 receives the message from the entrance relay apparatus 11, the client terminal 31 attaches an authentication header to the request message destined for "URL-A", and transmits the resulting request message again.

When the entrance relay apparatus 11 receives a request message with the authentication header from the client terminal 31, the entrance relay apparatus 11 transmits information on the authentication header to the authentication server 24 to cause the authentication server 24 to perform an authentication processing. When the entrance relay apparatus 11 receives a result representing "authentication has succeeded" from the authentication server 24, the entrance relay apparatus 11 transfers the request message transmitted from the client terminal 31 to the midway relay apparatus 12. At this time, the authentication header is deleted from the request message, and the label corresponding to the flow is attached to the request message.

When the midway relay apparatus 12 receives the request message from the entrance relay apparatus 11, the midway relay apparatus 12 determines the transfer destination on the basis of the label. At this time, according to logic in FIG. 34, the midway relay apparatus 12 determines which of plural transfer destinations the request message has passed through and which of the transfer destinations included in the transfer destination list of FIG. 13 the transfer destination of the request message is. Since the transmission source IP address is the IP address of the entrance relay apparatus 11, the midway relay apparatus 12 determines that the preceding node is the entrance relay apparatus 11 and that the insertion server 22 is the transfer destination. The midway relay apparatus 12 then transfers the request message received from the entrance relay apparatus 11 to the insertion server 22.

When the insertion application 211 on the insertion server 22 receives the request message from the midway relay apparatus 12, the insertion application 211 performs a processing using the request message. The insertion server 22 then transfers the request message to the midway relay apparatus 12.

When the midway relay apparatus 12 receives the request message from the insertion server 22, the midway relay apparatus 12 determines the transfer destination on the basis of the label. At this time, according to the logic depicted in FIG. 34, the midway relay apparatus 12 determines which of plural transfer destinations the request message has passed through and which of the transfer destinations included in the transfer destination list of FIG. 13 the transfer destination of the request message is. Since the transmission source IP address is the IP address of the insertion server 22, the midway relay apparatus 12 determines that the preceding node is the insertion server 22 and that the exit relay apparatus 13 is the transfer destination. The midway relay apparatus 12 then transfers the request message received from the insertion server 22 to the exit relay apparatus 13.

When the exit relay apparatus 13 receives the request message from the midway relay apparatus 12, the exit relay apparatus 13 determines the transfer destination on the basis of the label. In this embodiment, it is assumed that the transfer destination is the application server 41. The exit relay apparatus 13 transfers the request message received from the midway relay apparatus 12 to the application server 41.

When the application server 41 receives the request message from the exit relay apparatus 13, the application server 41 performs a processing using the request message. The application server 41 then transmits a response message corresponding to the received request message, to the exit relay apparatus 13 that is the transmission source of the request message, through the same connection as the connection through which the application server 41 has received the request message.

When the exit relay apparatus 13 receives the response message transmitted from the application server 41, the exit relay apparatus 13 identifies a socket with which the response message is to be transferred, using the socket association table 1309. The exit relay apparatus 13 transfers the response message with the identified socket.

When the midway relay apparatus 12 receives the response message transmitted from the exit relay apparatus 13, the midway relay apparatus 12 determines a socket with which the response message is to be transferred, using the socket association table 1210. The midway relay apparatus 12 then transfers the response message with the identified socket.

When the insertion server 22 receives the response message transmitted by the midway relay apparatus 12, the insertion server 22 performs a processing using the received response message. When there is an abnormality, the insertion server 22 transmits a warning message to a security server. The insertion server 22 then identifies a socket with which the response message is to be transferred, using the socket association table 213 and transfers the response message with the identified socket.

When the midway relay apparatus 12 receives the response message transmitted by the insertion server 22, the midway relay apparatus 12 identifies a socket through which the response message is to be transferred, using the socket association table 1210, and transfers the response message through the identified socket.

When the entrance relay apparatus 11 receives the response message transmitted by the midway relay apparatus 12, the entrance relay apparatus 11 identifies a socket with which the response message is to be transferred, using the socket association table 1115. The entrance relay apparatus 11 then transfers the response message with the identified socket.

Then, the client terminal 31 receives the response message transmitted by the entrance relay apparatus 11.

In stage (3), the control server 23 accepts an input of an instruction to change the path for a specific flow from the administrator or the like. The instruction to change the path includes the ID of the flow whose path is to be changed, information on the relay apparatuses on a new path, and the like. The control server 23 then transmits setting information concerning the new path to the entrance relay apparatus 11, the midway relay apparatus 14, and the exit relay apparatus 13 on the new path.

Referring now to FIGS. 28 to 37, the operations of the relay apparatuses will be described. The respective operations of the entrance relay apparatus 11, the midway relay apparatus 12, the midway relay apparatus 14 and the exit relay apparatus 13 will be described using the flowcharts of FIGS. 28, 29, 34, 35, and 37. However, to simplify the description, the operation of the entrance relay apparatus 11 will be basically described, and the operations of other relay apparatuses will be described as necessary.

First, the receiving unit 1101 of the entrance relay apparatus 11 receives a message (step S1 in FIG. 28) and outputs the message to the identification unit 1106.

The identification unit 1106 determines whether or not the received message is an HTTP request message (step S3). The identification unit 1106 makes this determination, for example, on the basis of a port number.

When the message is not an HTTP request message (that is, the message is a HTTP response message) (step S3: NO route), the processing proceeds to step S43 in FIG. 37 via a terminator A.

When the message is an HTTP request message (step S3: YES route), the identification unit 1106 determines whether or not the request message contains a label field (step S5). When the request message contains a label field (step S5: YES route), the processing proceeds to step S17. When the request message contains no label field (step S5: NO route), the identification unit 1106 performs an authentication processing (step S7). The authentication processing will be described with reference to FIG. 29. The authentication is performed, for example, by basic authentication using an HTTP proxy.

Figure 29:
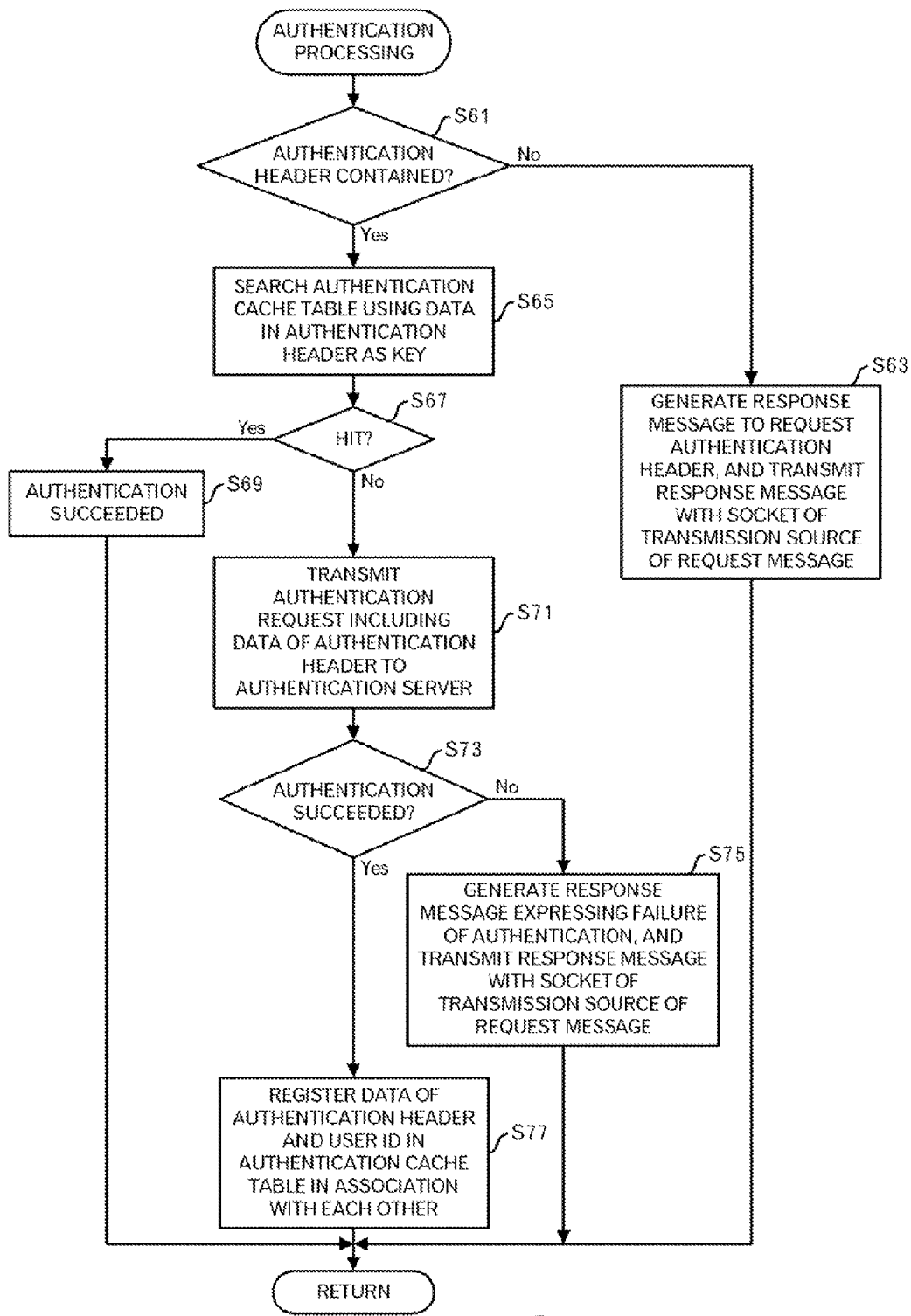
FIG. 29 is a diagram depicting a processing flow of an authentication processing.

First, the identification unit 1106 determines whether or not the request message contains an authentication header (FIG. 29: step S61). When the request message contains no authentication header (step S61: NO route), the identification unit 1106 generates a response message to request an authentication header, and transmits the response message with the socket of the transmission source of the request message (step S63). A message containing no authentication header is, for example, a request message as illustrated in FIG. 30. A response message to request an authentication header is, for example, a response message as illustrated in FIG. 31.

On the other hand, when the request message contains an authentication header (step S61: YES route), the identification unit 1106 searches the authentication cache table 1117 using information in the authentication header as a key (step S65). A message containing an authentication header is, for example, a request message as illustrated in FIG. 32.

When the authentication cache table 1117 contains the information of the authentication header (i.e., there is a hit) (step S67: YES route), the identification unit 1106 determines that the authentication has succeeded (step S69). When there is no hit (step S67: NO route), the identification unit 1106 transmits an authentication request containing the information of the authentication header to the authentication server 24 (step S71). In response to this authentication request, the authentication server 24 determines whether or not access from the client terminal 31 can be approved. Note that a case where there is no hit means a case where the authentication cache table 1117 does not contain the information of the authentication header, as illustrated in FIG. 33.

When data received from the authentication server 24 contains a user ID and represents that the authentication has succeeded (step S73: YES route), the identification unit 1106 registers the information of the authentication header and the user ID in the authentication cache table 1117 in association with each other (step S77). On the other hand, when the data received from the authentication server 24 represents that the authentication has failed (step S73: NO route), the identification unit 1106 generates a response message representing that the authentication has failed and transmits the response message with the socket of the transmission source of the request message (step S75). The processing then returns to the calling-source processing.

In this way, user authentication can be performed properly.

Figure 28:
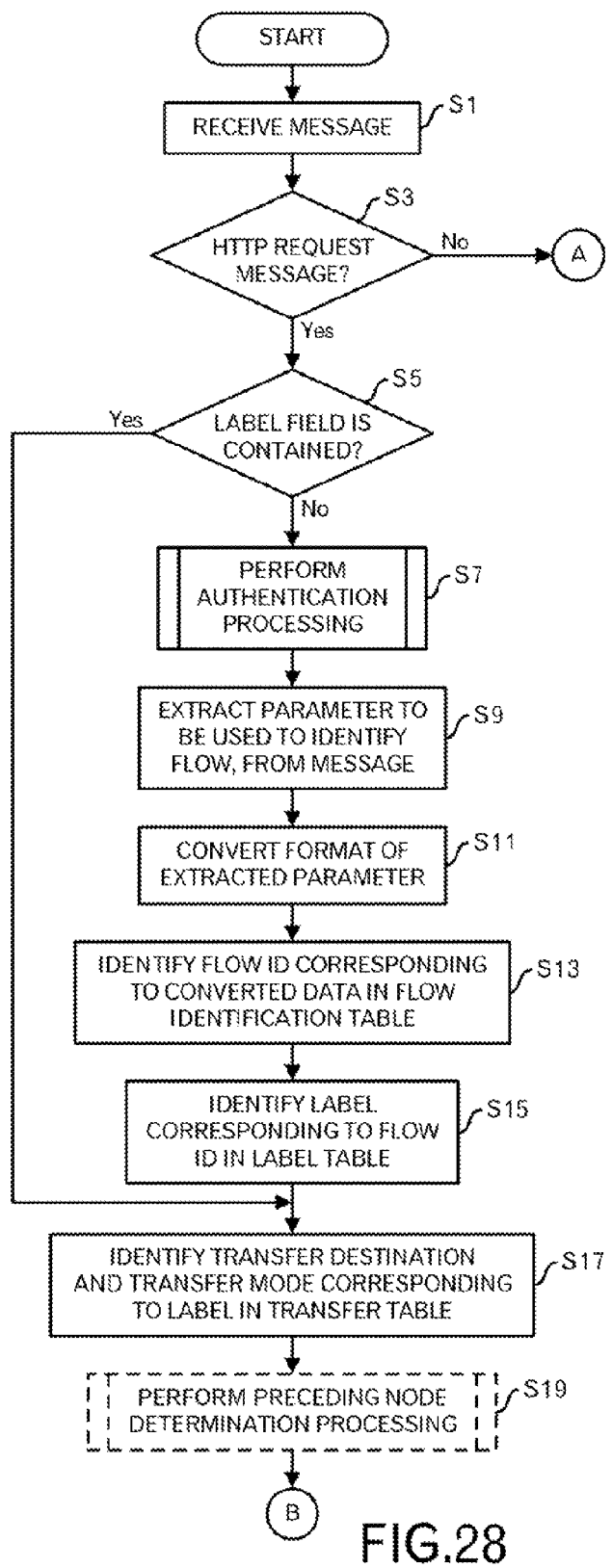
FIG. 28 is a diagram depicting a processing flow of a processing executed by the relay apparatus.

Referring back to the explanation of FIG. 28, the identification unit 1106 reads a parameter and information representing the storage position of the parameter from the extraction table 1119. Then, using the read information, the identification unit 1106 extracts a parameter to be used to identify the flow, from the request message (step S9).

The identification unit 1106 then converts the format of the extracted parameter (step S11). At the step S11, the identification unit 1106 converts information in the "Proxy-Authorization" field included in the request message into a user ID on the basis of data stored in the authentication cache table 1117. The identification unit 1106 also converts information in the "User-Agent" field into an OS type on the basis of data stored in the OS determination table 1118.

The identification unit 1106 then identifies a flow ID corresponding to the user ID and OS type that were obtained as the result of the format conversion from the flow identification table 1116 (step S13). The label management unit 1104 identifies a label corresponding to the flow ID identified at the step S13 from the label table 1113 (step S15).

The transfer destination determination unit 1105 identifies a transfer destination and transfer mode corresponding to the label identified at the step S15 from the transfer table 1112 (step S17).

When the transfer mode identified at the step S17 is "midway", the transfer destination determination unit 1204 of the midway relay apparatus 12 performs a preceding node determination processing (step S19). The preceding node determination processing will be described with reference to FIG. 34. Since the step S19 is performed only when the transfer mode identified at the step S17 is "midway", the block of the step S19 is depicted by a dotted line in FIG. 28.

First, the transfer destination determination unit 1204 searches the preceding node determination table 1209 using the IP address of the transmission source of the request message as a key (step S81 in FIG. 34). When the transmission source IP address of the request message is stored in the preceding node determination table 1209 (i.e., there is a hit) (step S83: YES route), the transfer destination determination unit 1204 identifies the ID of a preceding node corresponding to the transmission source IP address from the preceding node determination table 1209. When it is hit, the preceding node is determined to be the insertion server 21 or insertion server 22. Accordingly, the transfer destination determination unit 1204 identifies a transfer destination list corresponding to the transmission source IP address in the transfer destination table 1208 and identifies a transfer destination which is not the preceding node, among the transfer destinations included in the identified transfer destination list (step S85).

When there is no hit (step S83: NO route), the transfer destination determination unit 1204 identifies the ID of a preceding node corresponding to the transmission source IP address from the preceding node determination table 1209. When there is no hit, the preceding node is determined not to be the insertion server 21 or insertion server 22. Accordingly, the transfer destination determination unit 1204 identifies the first transfer destination in the transfer destination list (step S87). The processing then returns to the calling-source processing.

In this way, even the midway relay apparatus 12 or midway relay apparatus 14, which cannot uniquely determine the transfer destination using only a label, can determine the transfer destination properly.

Figure 35:
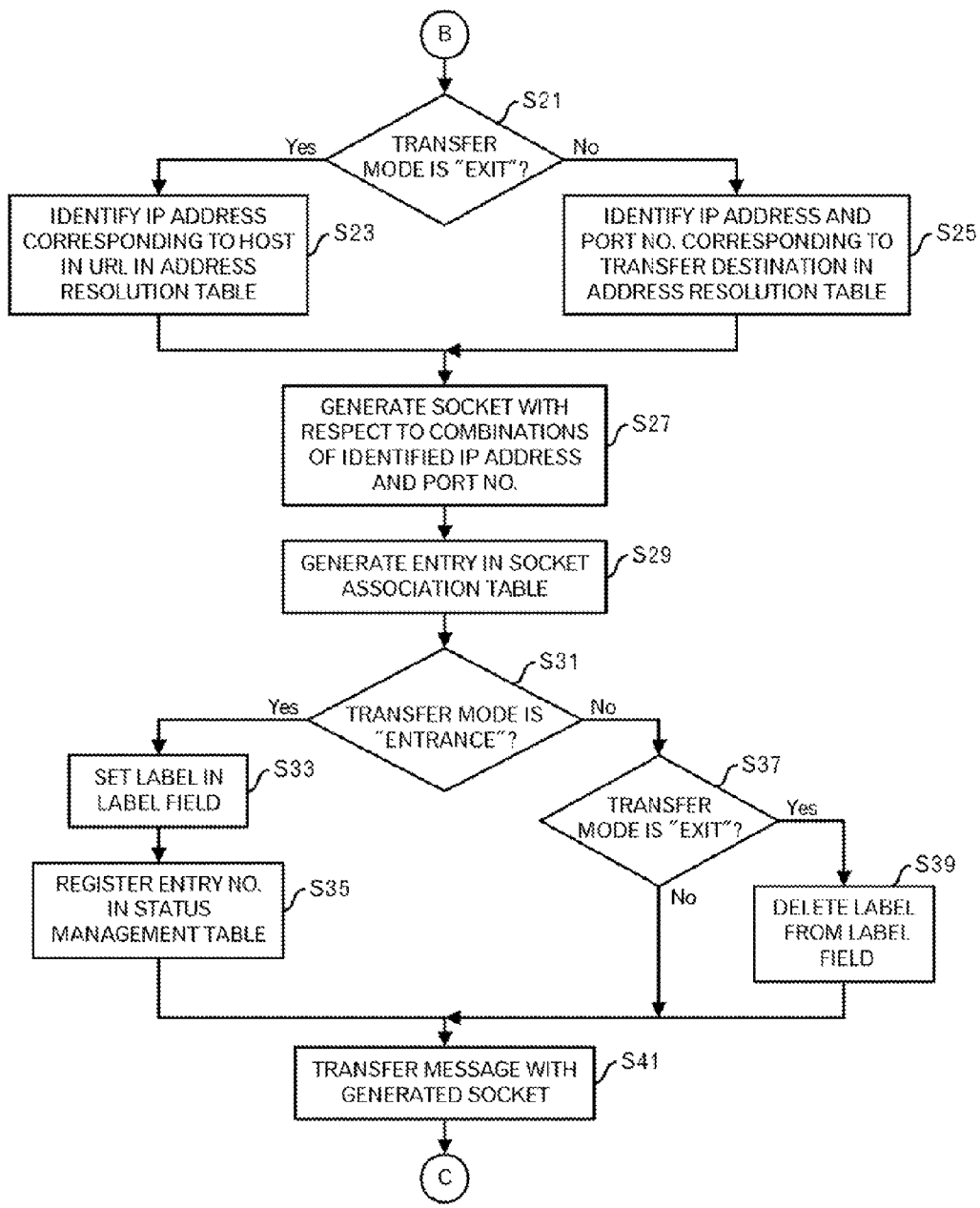
FIG. 35 is a diagram depicting a processing flow of a processing executed by the relay apparatus.
Figure 37:
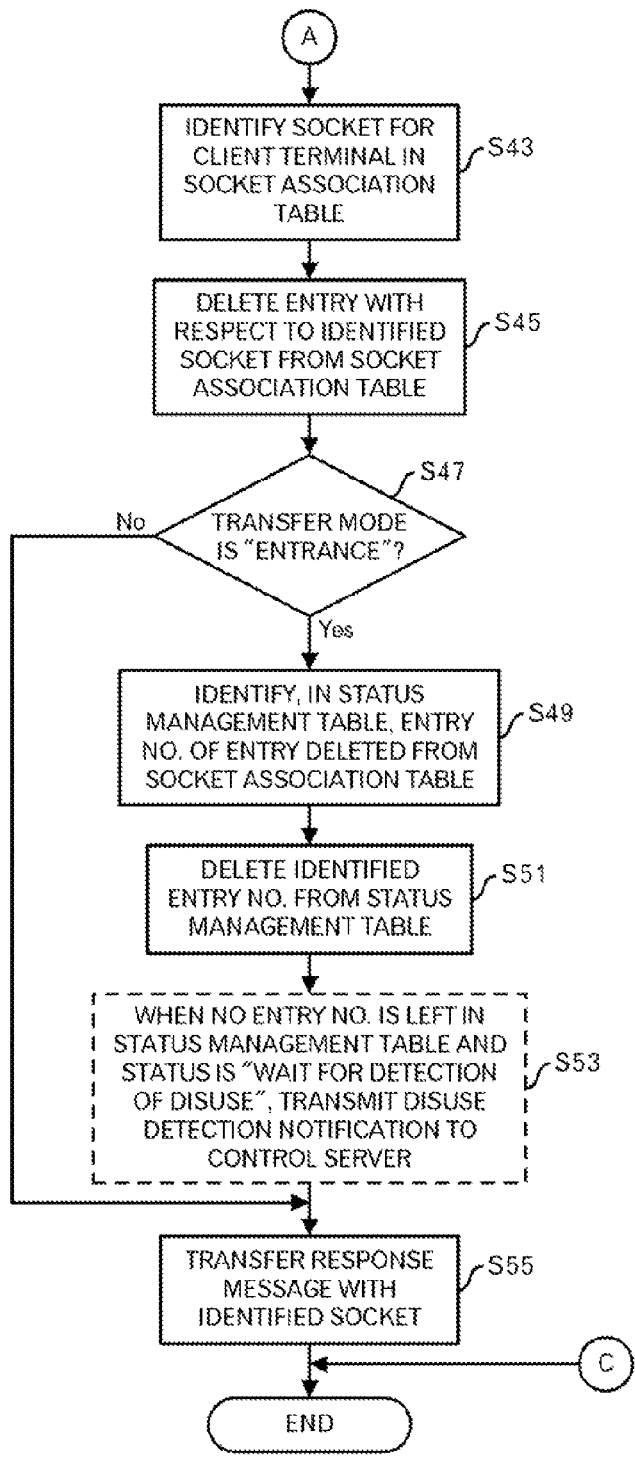
FIG. 37 is a diagram depicting a processing flow of a processing executed by the relay apparatus.

Referring back to the explanation of FIG. 28, when the step S19 ends, the processing then proceeds to step S21 of FIG. 35 via a terminator B.

Shifting now to the explanation of FIG. 35, the address resolution unit 1109 determines whether or not the transfer mode identified at the step S17 is "exit" (step S21). When the transfer mode is "exit" (step S21: YES route), the address resolution unit 1306 of the exit relay apparatus 13 identifies an IP address corresponding to a host in a URL included in the request message from the address resolution table 1307 (step S23). It is assumed that the port number is "80", for example.

On the other hand, when the transfer mode is not "exit" (step S21: NO route), the address resolution unit 1109 of the entrance relay apparatus 11 identifies an IP address and port number corresponding to the transfer destination identified at the step S17 or step S19 in the address resolution table 1111 (step S25). The address resolution unit 1109 also generates a socket with respect to a combination of the identified IP address and port number (step S27).

The transmission unit 1102 generates an entry including a socket for the client terminal, a socket for the application server (i.e., the sockets generated at the step S27), a label, and a transfer mode in the socket association table 1115 (step S29).

The transmission unit 1102 determines whether or not the transfer mode identified at the step S17 is "entrance" (step S31). When the transfer mode is "entrance" (step S31: YES route), the transmission unit 1102 sets the label identified at the step S15 in the label field of the request message (step S33). A request message having a label set in the label field is, for example, a request message as depicted in FIG. 36.

Then, the path control unit 1108 registers the entry number of the entry generated at the step S29 in the status management table 1114 (step S35). The processing then proceeds to step S41.

On the other hand, when the transfer mode is not "entrance" (step S31: NO route), the transmission unit 1102 determines whether or not the transfer mode is "exit" (step S37). When the transfer mode is "exit" (step S37: YES route), the transmission unit 1302 of the exit relay apparatus 13 deletes the label from the HTTP header of the request message (step S39). The processing then proceeds to step S41. When the transfer mode is not "exit" (that is, the transfer mode is "midway") (step S37: NO route), the transmission unit 1202 of the midway relay apparatus 12 transfers the request message with the generated socket (step S41). The processing proceeds to a processing in FIG. 37 via a terminator C and then ends.

On the other hand, when the message is determined at the step S3 to be a response message (step S3: NO route), the transfer destination determination unit 1105 identifies a socket for the client terminal, which corresponds to a socket for the application server that is the transmission source of the response message, from the socket association table 1115 (step S43 in FIG. 37). The path control unit 1108 also deletes an entry with respect to the association between the socket for the client terminal, which was identified at the step S43, and the socket for the application server from the socket association table 1115 (step S45).

Subsequently, the transfer destination determination unit 1105 determines whether or not the transfer mode is "entrance" (step S47). When the transfer mode is not "entrance" (step S47: NO route), the processing proceeds to step S55.

When the transfer mode is "entrance" (step S47: YES route), the path control unit 1108 identifies the entry number of the entry deleted at the step S45 from an entry number list of the status management table 1114 (step S49). Specifically, the path control unit 1108 identifies, in the status management table 1114, an entry number list corresponding to a label included in the entry deleted at the step S45 and identifies the corresponding entry number in the identified entry number list. The path control unit 1108 then deletes the entry number identified at the step S49 from the entry number list of the status management table 1114 (step S51).

When no entry number is left in the entry number list due to the deletion of the entry number at the step S51 and the path status in the status management table 1114 is "wait for detection of disuse", the path control unit 1108 detects that the path has gone out of use. The path control unit 1108 then transmits disuse detection notification representing that a path to which the label corresponding to the entry number list is assigned has gone out of use, to the control server 23 (step S53). When the path has not gone out of use, the step S53 is not performed. Accordingly, the block of the step S53 is depicted by a dotted line in FIG. 37.

Subsequently, the transmission unit 1102 transfers the response message with the socket for the client terminal, which was identified at the step S43 (step S55). Then, the processing ends.

By transferring the messages in the above-mentioned manner, the path of the request message and the path of the response message become the same. Further, the data on the association between the sockets is deleted upon confirming that the response message corresponding to the request message has been received. As a result, the resources related to the old path are freed earlier.

Figure 38A:
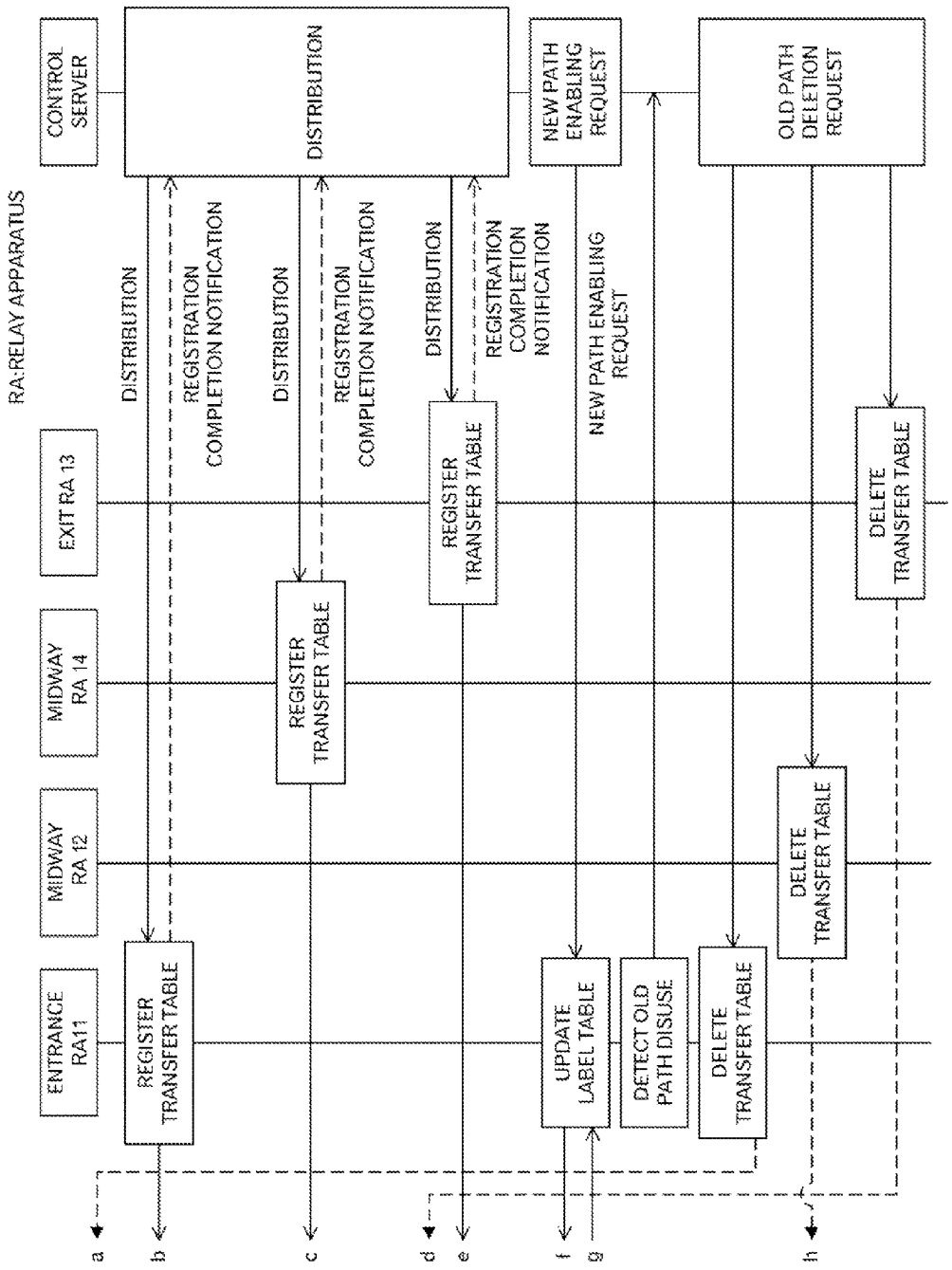
FIGS. 38A and 38B are sequence diagrams to explain operations of each relay apparatus and the control server during changing the path.
Figures 38B, 40:
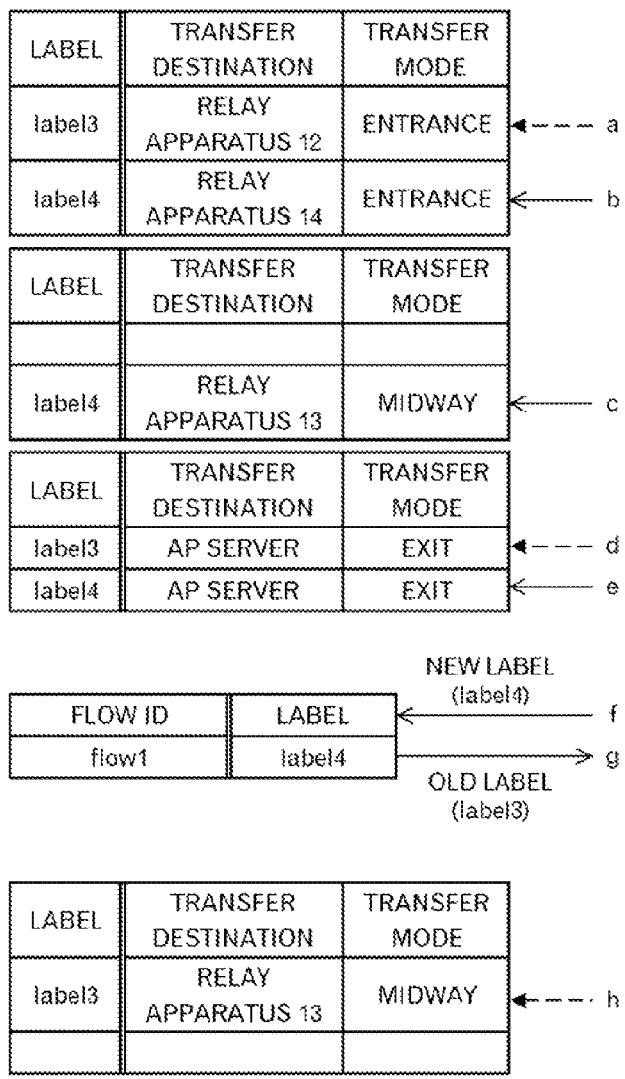
FIG. 40 is a diagram depicting an example of information on a new path.

Hereafter, the operations of the control server 23 and each relay apparatus during a change of the path will be outlined with reference to a control sequence in FIGS. 38A and 38B. In this control sequence, it is assumed that a label assigned to the old path is "label 3"; a label assigned to the new path is "label 4".

First, the control server 23 transmits the label of the new path (label 4), the ID and transfer mode of the next-hop node, and the like to the relay apparatuses on the new path (entrance relay apparatus 11, midway relay apparatus 14, and exit relay apparatus 13).

The entrance relay apparatus 11, the midway relay apparatus 14 and the exit relay apparatus 13 register the data received from the control server 23 in the respective transfer tables. At this time, the label of the old path and the like is not deleted.

Upon completing the registration of the data in the transfer tables, the entrance relay apparatus 11, the midway relay apparatus 14, and the exit relay apparatus 13 respectively transmit registration completion notification representing the completion of the registration to the control server 23.

The control server 23 receives the registration completion notification from all of the entrance relay apparatus 11, the midway relay apparatus 14, and the exit relay apparatus 13 and transmits a request to enable the new path to the entrance relay apparatus 11.

When the entrance relay apparatus 11 receives the request to enable the new path from the control server 23, the entrance relay apparatus 11 updates the label table 1113. Specifically, the entrance relay apparatus 11 changes the label corresponding to the flow whose path is to be changed, from "label 3" to "label 4".

Subsequently, when the entrance relay apparatus 11 detects that the old path, to which the label 3 has been assigned, has gone out of use, the entrance relay apparatus 11 transmits disuse detection notification representing the detection of the disuse to the control server 23.

When the control server 23 receives the disuse detection notification representing the detection of the disuse of the old path, the control server 23 transmits an old path deletion request to delete the old path, to the relay apparatuses (entrance relay apparatus 11, midway relay apparatus 12, and exit relay apparatus 13) on the old path.

When the entrance relay apparatus 11, the midway relay apparatus 12, and the exit relay apparatus 13 respectively receive the old path deletion request, they delete the label of the old path, and the like from the respective transfer tables. More specifically, these relay apparatuses delete the label, and the ID and transfer mode of the transfer destination node from the respective transfer tables.

Thus, the resources associated with the old path can be freed earlier.

Next, referring now to FIGS. 39 to 41, the operations of the control server 23 and each relay apparatus during a change of the path will be described.

Figure 39:
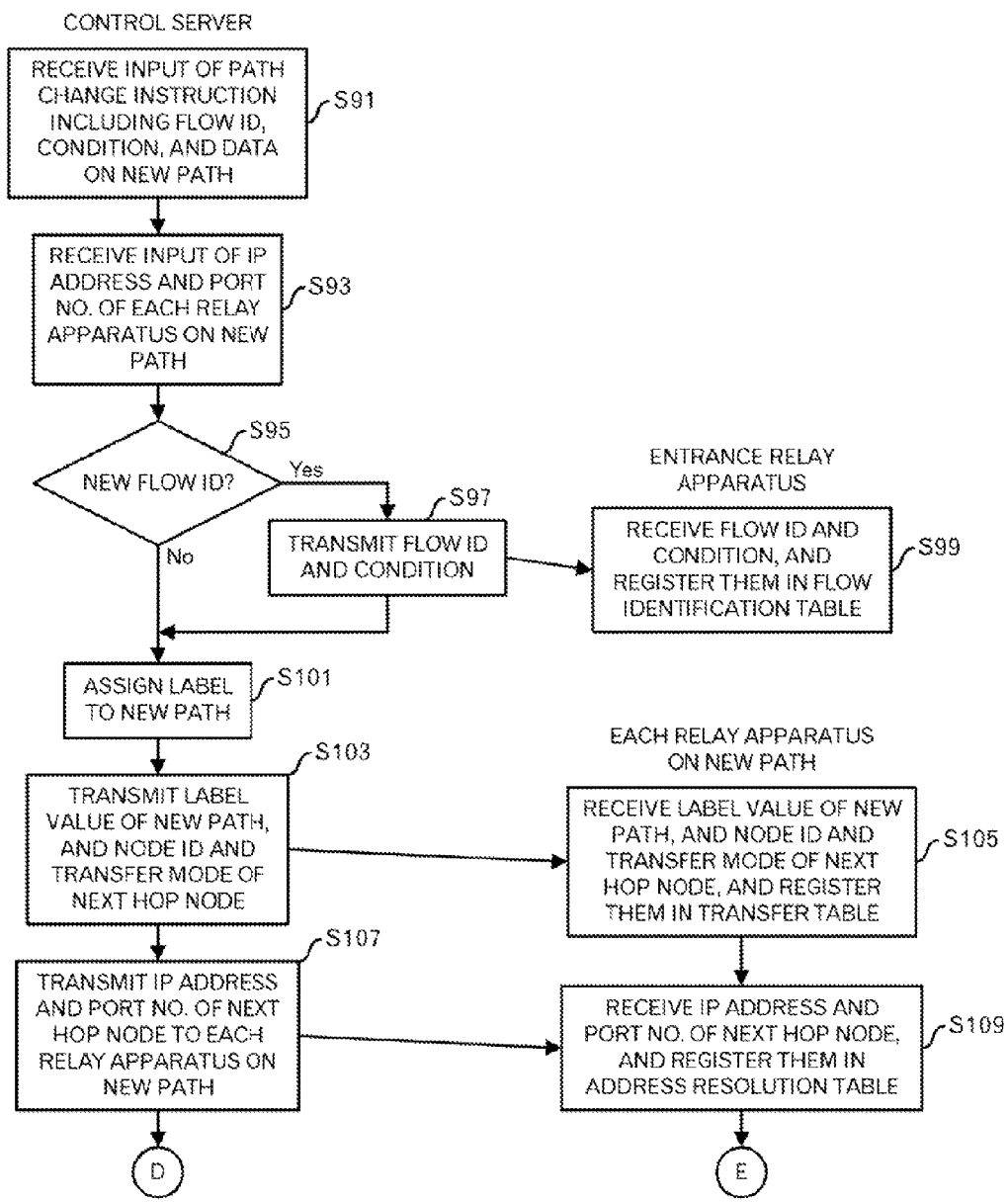
FIG. 39 is a diagram depicting a processing flow of a processing executed by each relay apparatus and the control server.

First, the distribution unit 231 of the control server 23 accepts an input of a path change instruction including a flow ID, a condition, and information on the new path, from the administrator or the like (step S91 in FIG. 39). Examples of the condition include a condition that the user ID is "user01" and the OS type is "Win2000". When such a condition is met, the flow is regarded as a flow relating to the inputted flow ID (hereafter, referred to as "target flow ID"). The information on the new path is, for example, information as depicted in FIG. 40. As seen, the information on the new path includes at least the IDs of the relay apparatuses on the new path and the order in which a request message is transferred among the relay apparatuses.

The distribution unit 231 accepts an input of the IP address and port number of each relay apparatus on the new path from the administrator or the like (step S93). When the control server 23 holds a database storing the IP addresses and the like of the relay apparatuses disposed in the network 10, the distribution unit 231 may read the above-mentioned information from that database.

The distribution unit 231 determines whether or not the target flow ID is a new flow ID (step S95). When the target flow ID is a new flow ID (step S95: YES route), the distribution unit 231 transmits the flow ID and the condition to the entrance relay apparatus 11 on the new path (step S97). The identification unit 1106 of the entrance relay apparatus 11 on the new path receives the flow ID and the condition and registers them in the flow identification table 1116 (step S99).

On the other hand, when the target flow ID is not a new flow ID (step S95: NO route), the distribution unit 231 assigns a label to the new path (step S101).

The distribution unit 231 then transmits the label of the new path, and the ID and the transfer mode of the next-hop node to the relay apparatuses on the new path (entrance relay apparatus 11, midway relay apparatus 14, and exit relay apparatus 13) (step S103). The transfer destination determination unit 1105 of each relay apparatus on the new path receives the label of the new path, and the ID and transfer mode of the next-hop node and registers them in the transfer table (step S105). At the step S105, each transfer destination determination unit 1105 registers the label of the new path in the label column, the ID of the next-hop node in the transfer destination column, and the transfer mode in the transfer mode column.

The distribution unit 231 of the control server 23 also transmits the IP address and port number of the next-hop node to the respective relay apparatuses on the new path (entrance relay apparatus 11, midway relay apparatus 14, and exit relay apparatus 13) (step S107). Each relay apparatus on the new path receives the IP address and port number of the next-hop node and registers them in the address resolution table (step S109). The processing proceeds to a processing in FIG. 41 via terminators D and E.

Figure 41:
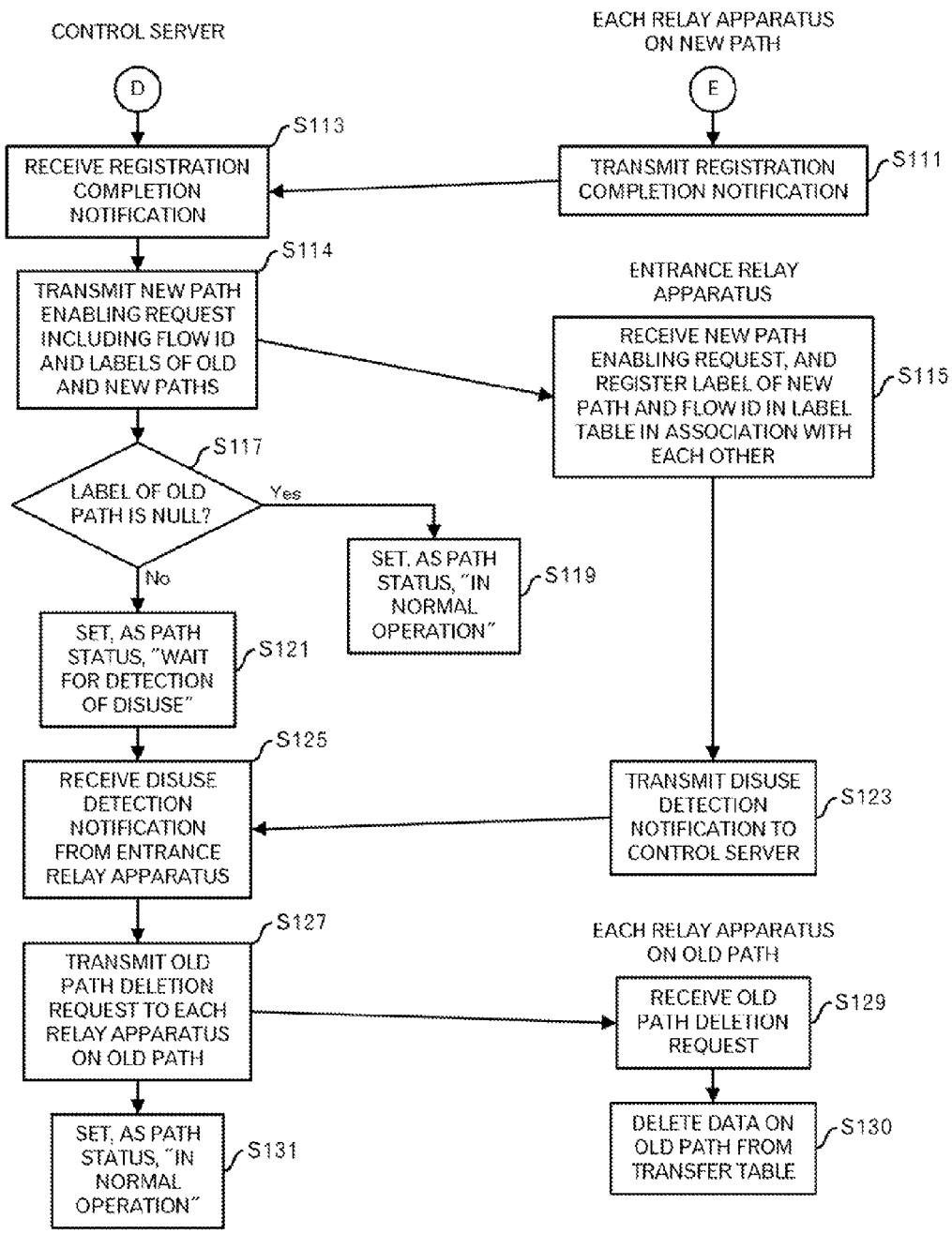
FIG. 41 is a diagram depicting a processing flow of a processing executed by each relay apparatus and control server.

Referring now to the explanation of FIG. 41, each relay apparatus on the new path transmits registration completion notification representing the completion of the registration to the control server 23 (step S111 in FIG. 41). The request unit 232 of the control server 23 receives the registration completion notification from each relay apparatus on the new path (step S113).

After receiving the registration completion notification from all of the relay apparatuses on the new path, the request unit 232 transmits a new path enabling request including the target flow ID and the respective labels of the old and new paths, to the entrance relay apparatus 11 on the new path (step S114). When the label management unit 1104 of the entrance relay apparatus 11 on the new path receives the new path enabling request, the label management unit 1104 registers the label of the new path and the target flow ID in the label table 1113 as associated with each other (step S115). When the label of the old path has been already registered at the step S115 in the label table 1113 in association with the target flow ID, the label management unit 1104 updates the label of the old path to that of the new path. The path control unit 1108 of the entrance relay apparatus 11 also sets, as the path status corresponding to the target flow ID, "wait for detection of disuse" in the status management table 1114.

The request unit 232 of the control server 23 determines whether or not the label of the old path is null (step S117). That is, since this is setting of the new flow, the request unit 232 determines whether or not there is the old path. When the label of the old path is null (step S117: YES route), the request unit 232 sets, as the path status corresponding to the target flow ID, "in normal operation" in the status management table 234 (step S119).

When the label of the old path is not null (step S117: NO route), the request unit 232 sets, as the path status corresponding to the target flow ID, "wait for detection of disuse" in the status management table 234 (step S121).

Subsequently, when the path control unit 1108 of the entrance relay apparatus 11 on the new path confirms that the old path is out of use, the path control unit 1108 transmits disuse detection notification representing the detection of the disuse (step S123). The path control unit 1108 also sets, as the path status corresponding to the target flow ID, "disuse detected" in the status management table 1114. The deletion unit 233 of the control server 23 then receives the disuse detection notification from the entrance relay apparatus 11 (step S125).

The deletion unit 233 transmits an old path deletion request to request deletion or release of the resources associated with the old path, to the relay apparatuses on the old path (entrance relay apparatus 11, midway relay apparatus 12, and exit relay apparatus 13) (step S127). When each relay apparatus on the old path receives the old path deletion request (step S129), each relay apparatus deletes the label of the old path and information on the transfer destination from the transfer table (step S130). The path control unit 1108 of the entrance relay apparatus 11 sets, as the path status corresponding to the target flow ID, "in normal operation" in the status management table 1114.

The deletion unit 233 of the control server 23 sets, as the path status corresponding to the target flow ID, "in normal operation" in the status management table 234 (step S131).

Figure 42:
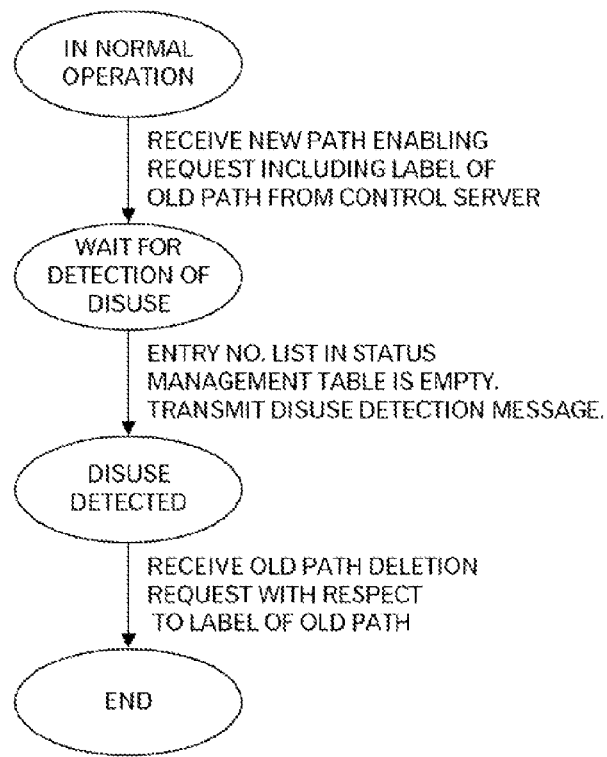
FIG. 42 is a diagram to explain transition of path states that are managed by the entrance relay apparatus.

FIG. 42 illustrates the transition of the path status managed for each label in the entrance relay apparatus 11. First, when the path is being operated normally, the entrance relay apparatus 11 sets, as the path status, "in normal operation". Upon receipt of a new path enabling request including the label of the old path from the control server 23, the entrance relay apparatus 11 changes the path status to "wait for detection of disuse". Subsequently, when an entry number list in the status management table becomes empty, the entrance relay apparatus 11 changes the path status to "disuse detected". Upon receipt of an old path deletion request related to the label of the old path, the entrance relay apparatus 11 deletes a relevant entry from the status management table 1114.

Figure 43:
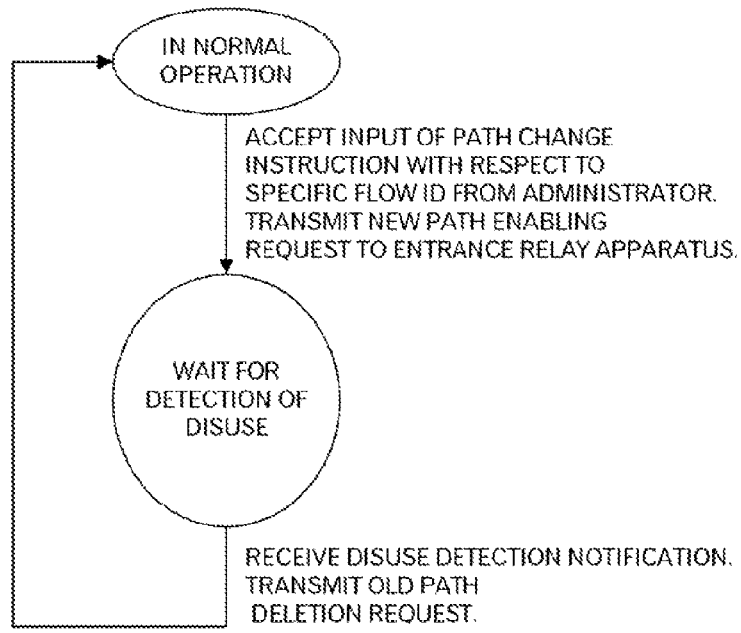
FIG. 43 is a diagram to explain the transition of the path states that are managed by the control server.

FIG. 43 illustrates the transition of the path status managed for each flow in the control server 23. First, when the path is being operated normally, the control server 23 sets, as the path status, "in normal operation". Subsequently, when the control server 23 accepts an input of a path change instruction with respect to a specific flow ID from the administrator, the control server 23 transmits a new path enabling request to the entrance relay apparatus 11 and then changes the path status to "wait for detection of disuse". Subsequently, when the control server 23 receives disuse detection notification from the entrance relay apparatus 11, the control server 23 transmits an old path deletion request to each relay apparatus on the old path. Subsequently, the control server 23 returns the path status to "in normal operation".

Thus, when the entrance relay apparatus 11 detects that the old path has gone out of use (that is, the entrance relay apparatus 11 confirms that there is no message being transferred on the old path), each relay apparatus on the old path can delete the resources related to the old path. As a result, the resources of the relay apparatuses can be used efficiently. Further, by changing the path as appropriate, it is possible to dynamically insert an application between the client terminals and the application server.

Second Embodiment

Next, a second embodiment will be described. In the second embodiment, it is assumed that HTTP chunked transfer encoding (i.e. chunked-type HTTP) is performed. That is, it is assumed that the client application installed on the client terminals 31 and 32 does not transmit the next request message before a series of response messages to one request message are returned.

In the second embodiment, a change is made to the step S45 as follows. That is, when a received message is the last response message of a series of response messages, the path control unit 1108 deletes the entry with respect to the association between the socket for the client terminal and the socket for the application server from the socket association table 1115.

Whether a series of response messages are a series of response messages subjected to the chunked-type HTTP is determined based on, for example, whether the HTTP header contains a field "Transfer-Encoding: chunked". Whether a response message is the last response message of a series of response messages is determined based on, for example, whether the HTTP body contains information "0<CRLF><CRLF>".

Third Embodiment

Figures 44, 45:
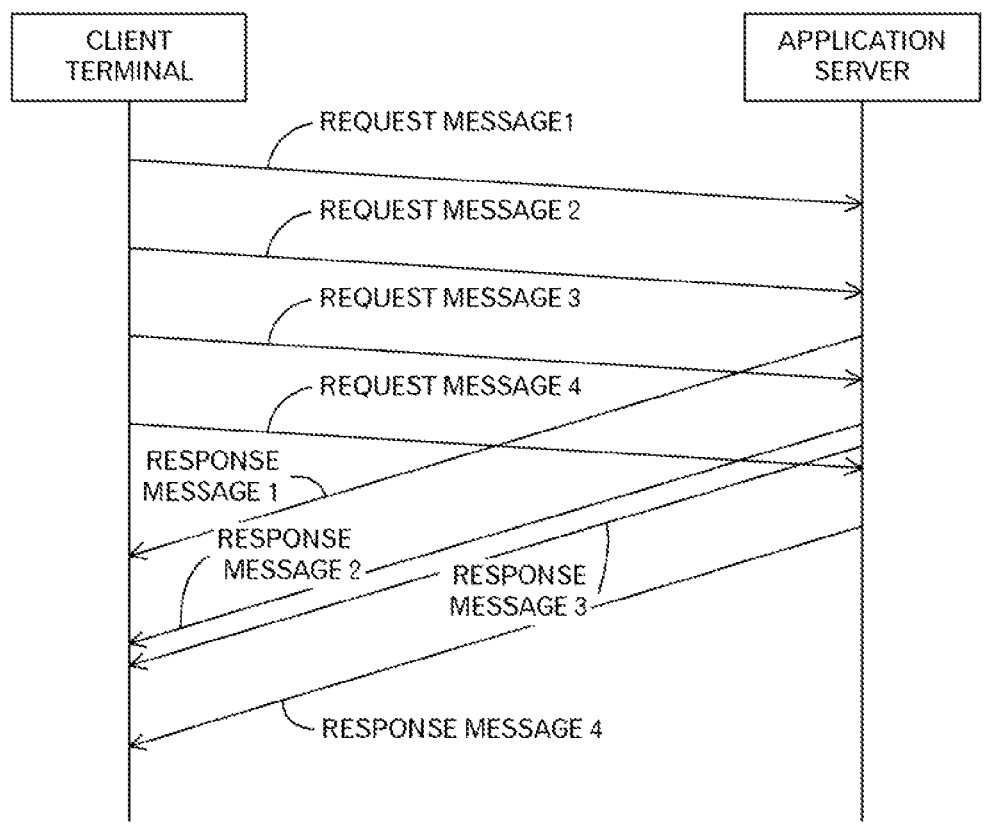
FIG. 44 is a diagram depicting an example of a relationship between the request message and the response message in the pipeline-type HTTP.
FIG. 45 is a diagram depicting an example of counters for managing the number of request messages and the number of response messages.

Next, a third embodiment will be described. In the third embodiment, it is assumed that HTTP pipelining (i.e. pipeline-type HTTP) is performed. FIG. 44 is a diagram depicting an example of the relationship between request messages and response messages in HTTP pipelining. As seen, in HTTP pipelining, the client application installed on the client terminals 31 and 32 transmits the next request message without waiting for a response message to one request message to be returned. In this case, even after the entrance relay apparatus 11 transfers one response message to the client terminal 31 or client terminal 32, other response messages may remain in a path between the entrance relay apparatus 11 and the application server 41.

For this reason, the path control unit 1108 of the entrance relay apparatus 11 manages counters for counting the number of transferred request messages and the number of transferred response messages. FIG. 45 illustrates an example of the counters. In the example depicted in FIG. 45, the number of transferred request messages and the number of transferred response messages are counted for each label.

Since response messages are endlessly returned unless the transfer of request messages is stopped, the entrance relay apparatus 11 buffers request messages.

Figure 46:
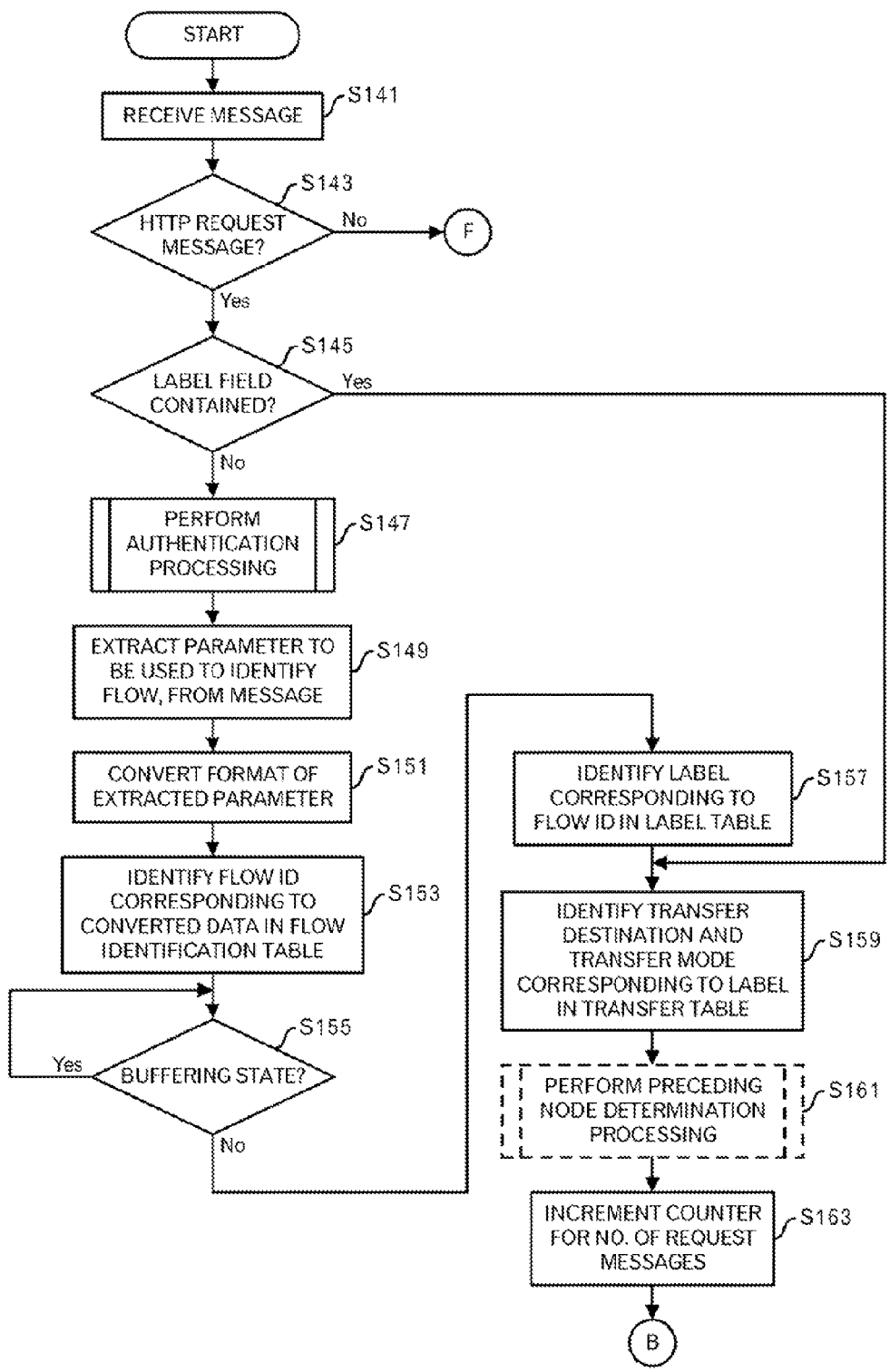
FIG. 46 is a diagram depicting a processing flow of a processing executed by the relay apparatus.

Referring now to FIG. 46, the operation of a relay apparatus in a third embodiment will be described. A flowchart depicted in FIG. 46 differs from the flowchart illustrated in FIG. 28 in that steps S155 and S163 are adopted.

First, the receiving unit 1101 of the entrance relay apparatus 11 receives a message (step S141 in FIG. 46) and outputs the message to the identification unit 1106.

The identification unit 1106 determines whether or not the received message is an HTTP request message (step S143). The identification unit 1106 makes this determination, for example, on the basis of a port number.

When the message is not an HTTP request message (that is, the message is a HTTP response message) (step S143: NO route), the processing proceeds to step S165 in FIG. 47 via a terminator F.

When the message is an HTTP request message (step S143: YES route), the identification unit 1106 determines whether or not the request message contains a label field (step S145). When the request message contains a label field (step S145: YES route), the processing proceeds to step S159. When the request message contains no label field (step S145: NO route), the identification unit 1106 performs an authentication processing (step S147). The authentication processing is as described with reference to FIG. 29.

The identification unit 1106 reads a parameter and information representing the storage position of the parameter from the extraction table 1119. Using the read information, the identification unit 1106 extracts a parameter to be used to identify a flow, from the request message (step S149).

The identification unit 1106 then converts the format of the extracted parameter (step S151). In the step S151, the identification unit 1106 converts information in the "Proxy-Authorization" field of the request message into a user ID on the basis of data stored in the authentication cache table 1117. The identification unit 1106 also converts information in the "User-Agent" field thereof into an OS type on the basis of data stored in the OS determination table 1118.

The identification unit 1106 then identifies a flow ID corresponding to the user ID and OS type, which are obtained as the result of the format conversion in the flow identification table 1116 (step S153).

Subsequently, the transfer destination determination unit 1105 determines whether or not the entrance relay apparatus 11 is in a buffering state (step S155). In the step S155, the transfer destination determination unit 1105 determines that the entrance relay apparatus 11 is in a buffering state, when the transfer destination determination unit 1105 has already received a buffering request from the control server 23 but has not received a buffering cancelling request yet.

When the entrance relay apparatus 11 is in a buffering state (step S155: YES route), the transfer destination determination unit 1105 stores the request message in a buffer and waits until receiving a buffering cancelling request. When the entrance relay apparatus 11 is not in a buffering state (step S155: NO route), the label management unit 1104 identifies a label corresponding to the flow ID identified at the step S153 from the label table 1113 (step S157).

The transfer destination determination unit 1105 identifies a transfer destination and transfer mode corresponding to the label identified at the step S157 in the transfer table 1112 (step S159).

Then, when the transfer mode identified at the step S159 is "midway", the transfer destination determination unit 1204 of the midway relay apparatus 12 performs a preceding node determination processing (step S161). The preceding node determination processing is as described with reference to FIG. 34. Since the step S161 is performed only when the transfer mode identified at the step S159 is "midway", the block of the step S161 is depicted by a dotted line in FIG. 46.

Upon completion of the step S161, the path control unit 1108 of the entrance relay apparatus 11 increments a counter for the number of request messages (step S163). The processing proceeds to the step S21 in FIG. 35 via the terminator B.

Figure 47:
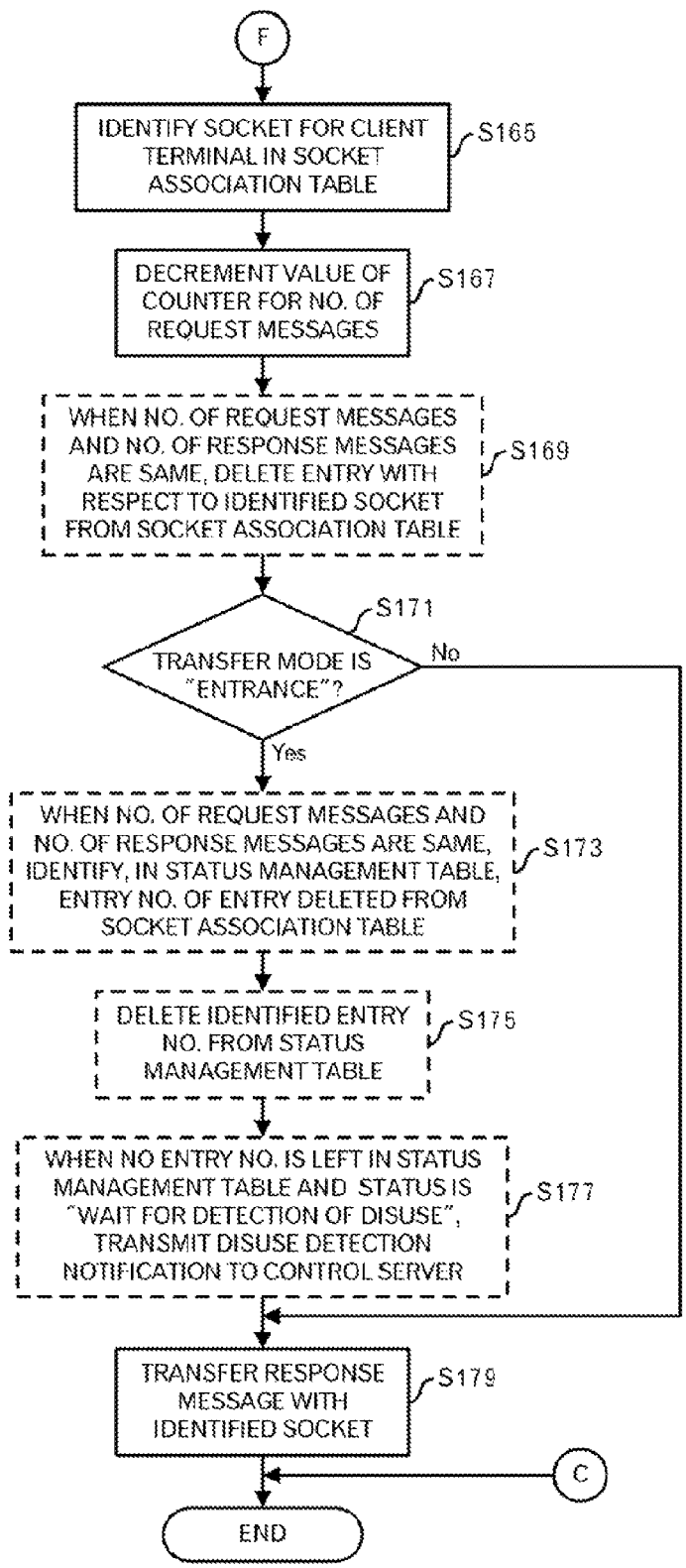
FIG. 47 is a diagram depicting a processing flow of a processing executed by the relay apparatus.

Referring now to FIG. 47, steps following a terminator F in FIG. 46 will be described. A flowchart depicted in FIG. 47 differs from the flowchart depicted in FIG. 37 in that steps S167, S169, and S173 are adopted.

The transfer destination determination unit 1105 identifies a socket for the client terminal, which corresponds to a socket for the application server, which is the transmission source of the response message, from the socket association table 1115 (step S165). At this time, the path control unit 1108 decrements the counter for the number of request messages (step S167). Further, when the number of request messages and the number of response messages are the same, the path control unit 1108 deletes an entry with respect to the socket for the client terminal, which was identified at the step S165 from the socket association table 1115 (step S169). When the number of request messages and the number of response messages are not the same, the step S169 is not performed. Accordingly, the block of the step S169 is illustrated by a dotted line in FIG. 47.

Subsequently, the transfer destination determination unit 1105 determines whether or not the transfer mode is "entrance" (step S171). When the transfer mode is not "entrance" (step S171: NO route), the processing proceeds to step S179.

In case where the transfer mode is "entrance" (step S171: YES route), when the number of request messages and the number of response messages are the same, the path control unit 1108 identifies the entry number of the entry deleted at the step S169 from an entry number list of the status management table 1114 (step S173). Specifically, the path control unit 1108 identifies an entry number list corresponding to a label included in the entry deleted at the step S169 from the status management table 1114 and identifies the relevant entry number in the identified entry number list. The path control unit 1108 then deletes the entry number identified at the step S173 from the entry number list of the status management table 1114 (step S175). When the number of request messages and the number of response messages are not the same, none of the steps S173 and S175 is performed. Accordingly, the blocks of the steps S173 and S175 are depicted by dotted lines in FIG. 47.

When no entry number is left in the entry number list due to the deletion of the entry number in the step S175 and the path status in the status management table 1114 is "wait for detection of disuse", the path control unit 1108 detects that the path has gone out of use. The path control unit 1108 then transmits disuse detection notification representing that a path to which a label corresponding to the entry number list was assigned has gone out of use, to the control server 23 (step S177). When the path has not gone out of use, the step S177 is not performed. Accordingly, the block of the step S177 is depicted by a dotted line in FIG. 47.

Subsequently, the transmission unit 1102 transfers the response message with the socket for the client terminal, which was identified at the step S165 (step S179). Then, the processing ends.

Figure 48:
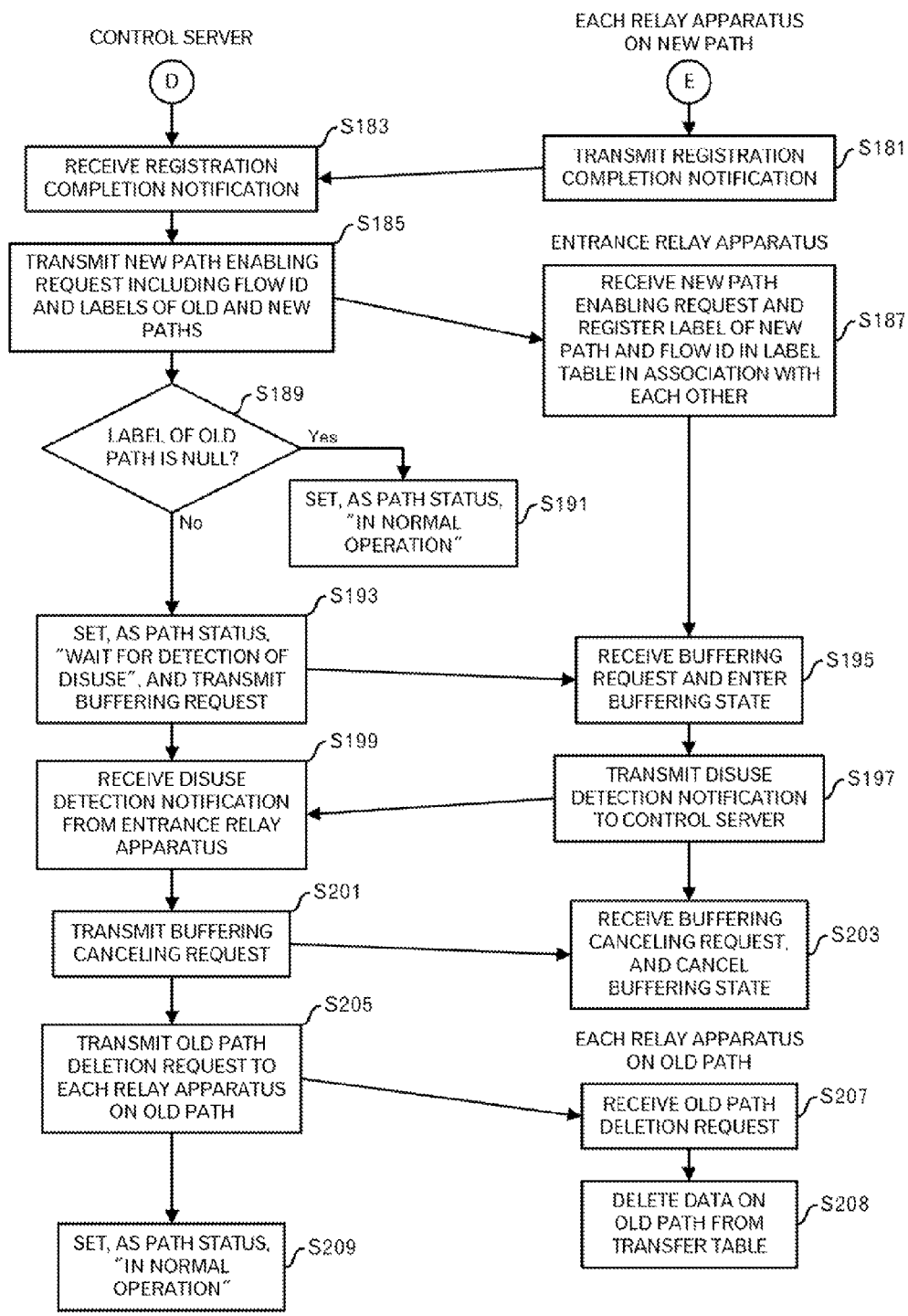
FIG. 48 is a diagram depicting a processing flow of a processing executed by each relay apparatus and the control server.

Referring now to FIG. 48, the operations of the control server 23 and each relay apparatus during a change of the path will be described. However, since steps up to the terminators D and E are the same as those in the first embodiment, steps following the terminators D and E will be described. A flowchart depicted in FIG. 48 differs from the flowchart depicted in FIG. 41 in that steps S193, S195, S201, and S203 are adopted.

First, each relay apparatus on the new path transmits registration completion notification representing the completion of the registration to the control server 23 (step S181 in FIG. 48). The request unit 232 of the control server 23 receives the registration completion notification from each relay apparatus on the new path (step S183).

Upon receipt of the registration completion notification from all the relay apparatuses on the new path, the request unit 232 transmits a new path enabling request including the target flow ID and the respective labels of the old and new paths to the entrance relay apparatus 11 on the new path (step S185). When the label management unit 1104 of the entrance relay apparatus 11 on the new path receives the new path enabling request, the label management unit 1104 registers the label of the new path and the target flow ID in the label table 1113 in association with each other (step S187). In the step S187, when the label of the old path is already registered in the label table 1113 in association with the target flow ID, the label of the old path is updated to that of the new path. The path control unit 1108 sets, as the path status corresponding to the target flow ID, "wait for detection of disuse" in the status management table 1114.

The request unit 232 of the control server 23 determines whether or not the label of the old path is null (step S189). That is, since the new flow will be set, the request unit 232 determines whether or not there is the old path. When the label of the old path is null (step S189: YES route), the request unit 232 sets, as the path status corresponding to the target flow ID, "in normal operation" in the status management table 234 (step S191).

When the label of the old path is not null (step S189: NO route), the request unit 232 sets, as the path status corresponding to the target flow ID, "wait for detection of disuse" in the status management table 234 and transmits a buffering request with respect to the target flow ID to the entrance relay apparatus 11 (step S193). When the entrance relay apparatus 11 on the new path receives the buffering request with respect to the target flow ID from the control server 23, the entrance relay apparatus 11 enters a buffering state (step S195).

Subsequently, when the path control unit 1108 of the entrance relay apparatus 11 on the new path confirms that the old path is out of use, the path control unit 1108 transmits disuse detection notification representing the detection of the disuse to the control server 23 (step S197). The path control unit 1108 also sets, as the path status corresponding to the target flow ID, "disuse detected" in the status management table 1114. The deletion unit 233 of the control server 23 then receives the disuse detection notification from the entrance relay apparatus 11 (step S199).

The deletion unit 233 transmits a buffering cancelling request with respect to the target flow ID to the entrance relay apparatus 11 on the new path (step S201). When the entrance relay apparatus 11 on the new path receives the buffering cancelling request with respect to the target flow ID from the control server 23, the entrance relay apparatus 11 cancels the buffering state (step S203).

The deletion unit 233 of the control server 23 transmits an old path deletion request to delete or release the resources associated with the old path, to the relay apparatuses on the old path (entrance relay apparatus 11, midway relay apparatus 12, and exit relay apparatus 13) (step S205). When each relay apparatus on the old path receives the old path deletion request (step S207), each relay apparatus deletes information on the label of the old path and the transfer destination from the transfer table (step S208). The path control unit 1108 of the entrance relay apparatus 11 sets, as the path status corresponding to the target flow ID, "in normal operation" in the status management table 1114.

The deletion unit 233 of the control server 23 sets, as the path status corresponding to the target flow ID, "in normal operation" in the status management table 234 (step S209).

Thus, even when communications are performed by the pipeline-type HTTP, it is possible to properly determine the timing when the resources associated with the old path would be deleted or released.

Fourth Embodiment

Next, a fourth embodiment will be described. The fourth embodiment is a modification of the third embodiment. In the fourth embodiment, it is assumed that the number of response messages relative to the request messages varies, for example, due to filtering, copying of a message, or the like performed by the insertion application 211.

In such a case, the request unit 232 of the control server 23 receives information concerning an increase or decrease in the number of messages from the insertion application 211 and transmits the information concerning the increase or decrease in the number of messages to the entrance relay apparatus 11. The path control unit 1108 of the entrance relay apparatus 11 increments or decrements the value of the counter for the number of request messages or the value of the counter for the number of response messages on the basis of the information concerning the increase or decrease in the number of messages.

Thus, it is possible to deal with even a change in the number of messages resulting from the processing performed by the insertion application 211.

Fifth Embodiment

Next, a fifth embodiment will be described. In the fifth embodiment, it is assumed that no response message is returned due to a failure in the business application installed on the application server 41. In such a case, the entrance relay apparatus 11 previously records the time when it has transferred a request message and, if no response message is returned even when predetermined time has elapsed since the transfer of the request message, the entrance relay apparatus 11 determines that it has received a response message corresponding to the request message.

Thus, it is possible to deal with an accident such as occurrence of a failure in the business application.

Sixth Embodiment

Next, a sixth embodiment will be described. In the sixth embodiment, instead of the control server 23, the entrance relay apparatus 11 requests the other relay apparatuses on the old path to delete or release the resources associated with the old path.

In a first method, the entrance relay apparatus 11 transmits a dedicated control message to request the deletion or release of the resources associated with the old path. Specifically, the entrance relay apparatus 11 identifies a transfer destination corresponding to a label assigned to the old path and stored in the transfer table 1112 and transmits the control message to the identified transfer destination. The label assigned to the old path is set in the body of the control message. Further, a label to request the deletion or release of the old path is added to the control message.

The relay apparatus that has received the control message identifies, in the transfer table, a transfer mode corresponding to the label extracted from the body of the control message. When the transfer mode is not "exit", the relay apparatus identifies a transfer destination corresponding to the label from the transfer table and transfers the control message to the next relay apparatus. The relay apparatus then deletes an entry with respect to the label from the transfer table. On the other hand, when the transfer mode is "exit", the relay apparatus deletes, from the transfer table, an entry with respect to the label extracted from the body of the control message but does not transfer the control message.

In a second method, the entrance relay apparatus 11 adds a control header to request the deletion or release of the resources associated with the old path, to a request message received from the client terminal 31 or client terminal 32 and transfers the resulting request message to the next relay apparatus. This request message to which the control header is added is the last request message to be transferred along the old path. When each relay apparatus on the old path receives the request message with the control header, each relay apparatus refers to the transfer table to transfer the request message, and then deletes the relevant entry from the transfer table.

By performing the first method or second method, it is possible to reduce the processing load on the control server 23.

Seventh Embodiment

Next, a seventh embodiment will be described.

In the first embodiment, each time a response message corresponding to a request message is received, the relevant entry is deleted from the socket association table. The reason is that the client terminals 31 and 32 may transmit request messages having different path portions in URL using the same connection (in other words, request messages may be transferred along different paths).

However, when it is previously known based on a constraint on the system, the result of a path analysis, or the like that request messages are not transferred along different paths, the second and later request and response messages are also transferred between the entrance relay apparatus 11 and the exit relay apparatus 13 using the same connection. The seventh embodiment is applicable to, for example, a case where messages are transferred using the WebSocket protocol.

The seventh embodiment will be outlined briefly. In the seventh embodiment, even when a response message corresponding to a request message is received, the relevant entry in the socket association table is maintained unless release (or disconnection) of the connection is requested. The entry is deleted when the release of the connection is requested by the client terminals 31 and 32 or application server 41. Whether the release of the connection is requested is determined based on whether the HTTP header contains a field "Connection: close".

Figure 49:
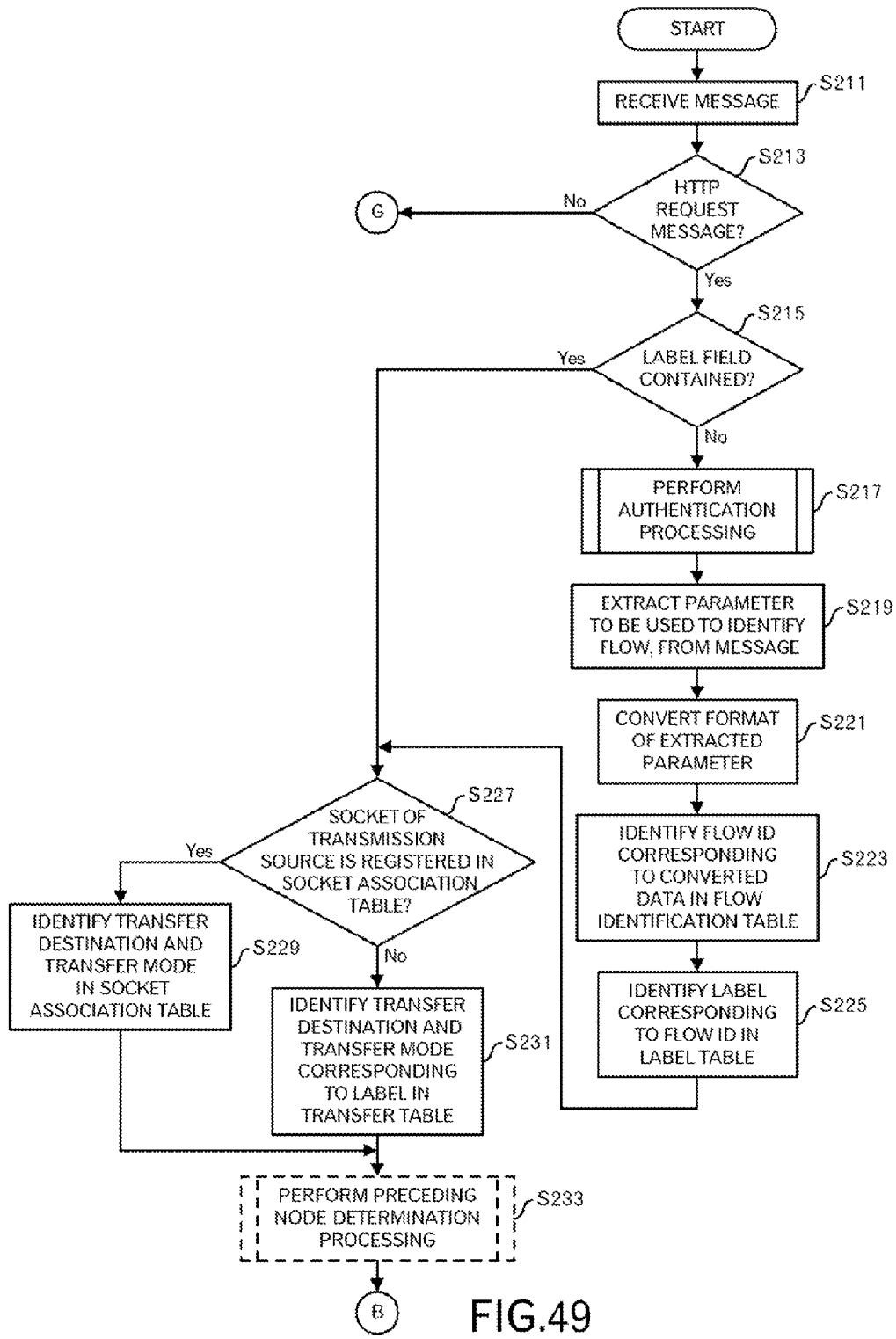
FIG. 49 is a diagram depicting a processing flow of a processing executed by the relay apparatus.

Referring now to FIG. 49, the operations of relay apparatuses according to the seventh embodiment will be described. A flowchart depicted in FIG. 49 differs from the flowchart depicted in FIG. 28 in that steps S227 and S229 are adopted.

First, the receiving unit 1101 of the entrance relay apparatus 11 receives a message (step S211 in FIG. 49) and outputs the message to the identification unit 1106.

The identification unit 1106 determines whether the received message is an HTTP request message (step S213). The identification unit 1106 makes this determination, for example, on the basis of a port number.

When the message is not an HTTP request message (that is, the message is a HTTP response message) (step S213: NO route), the processing proceeds to step S235 in FIG. 50 via a terminator G.

When the message is an HTTP request message (step S213: YES route), the identification unit 1106 determines whether or not the request message contains a label field (step S215). When the request message contains a label field (step S215: YES route), the processing proceeds to step S227. When the request message contains no label field (step S215: NO route), the identification unit 1106 performs an authentication processing (step S217). The authentication processing is as described with reference to FIG. 29.

The identification unit 1106 reads a parameter and information on the storage position of the parameter from the extraction table 1119. Using the read information, the identification unit 1106 extracts a parameter to be used to identify a flow, from the request message (step S219).

The identification unit 1106 then converts the format of the extracted parameter (step S221). In the step S221, the identification unit 1106 converts information in the "Proxy-Authorization" field of the request message into a user ID on the basis of data stored in the authentication cache table 1117. The identification unit 1106 also converts information in the "User-Agent" field into an OS type on the basis of data stored in the OS determination table 1118.

The identification unit 1106 then identifies a flow ID corresponding to the user ID and OS type that were obtained by the format conversion from the flow identification table 1116 (step S223).

The label management unit 1104 then identifies a label corresponding to the flow ID identified at the step S223 in the label table 1113 (step S225).

The transfer destination determination unit 1105 then determines whether or not the socket of the transmission source is registered in the socket association table 1115 (step S227). That is, the transfer destination determination unit 1105 determines whether or not the connection is maintained. When the socket of the transmission source is registered in the socket association table 1115 (step S227: YES route), the transfer destination determination unit 1105 identifies a socket and transfer mode corresponding to the socket of the transmission source in the socket association table 1115 (step S229). When the socket of the transmission source is not registered in the socket association table 1115 (step S227: NO route), the transfer destination determination unit 1105 identifies a transfer destination and transfer mode corresponding to the label identified at the step S225 in the transfer table 1112 (step S231).

When the transfer mode identified at the step S229 or step S231 is "midway", the transfer destination determination unit 1204 of the midway relay apparatus 12 performs a preceding node determination processing (step S233). The preceding node determination processing is as described with reference to FIG. 34. Since the step S233 is performed only when the transfer mode identified at the step S229 or S231 is "midway", the block of the step S233 is depicted by a dotted line in FIG. 49. The processing proceeds to the step S21 of FIG. 35 via the terminator B.

Figure 50:
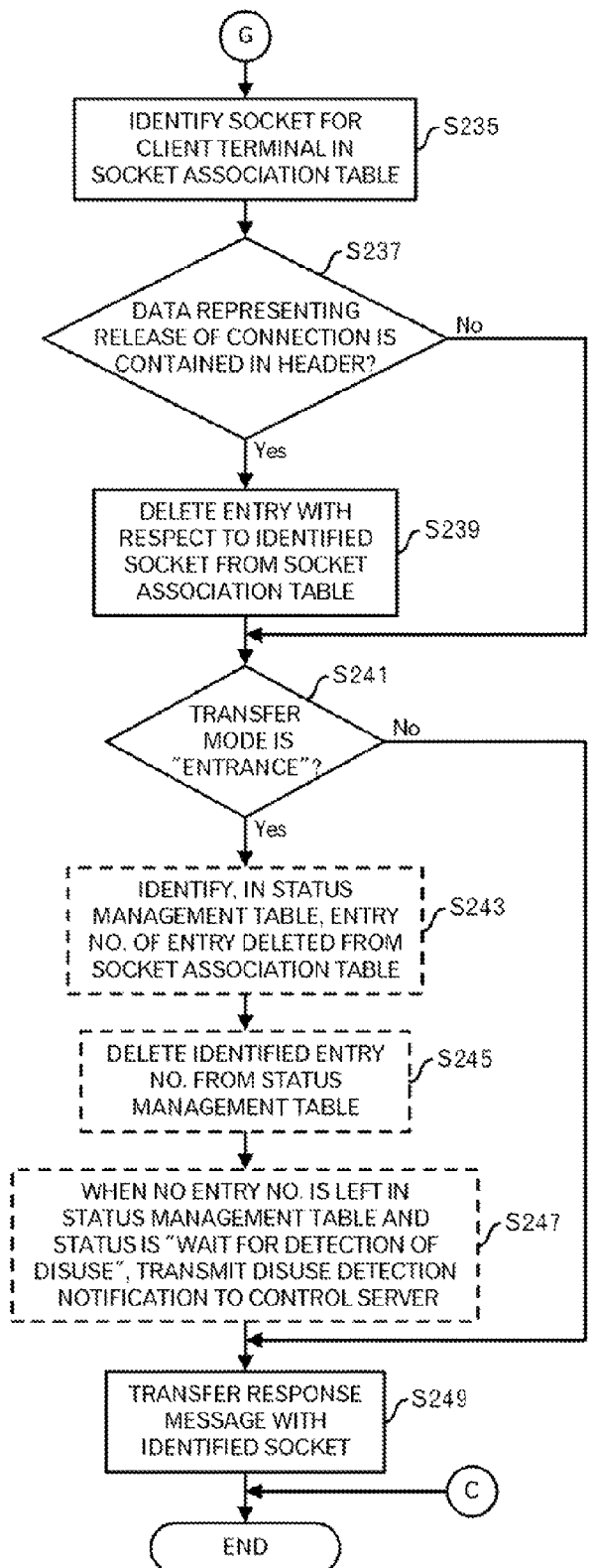
FIG. 50 is a diagram depicting a processing flow of a processing executed by the relay apparatus.

Referring now to FIG. 50, steps following the terminator G will be described. A flowchart depicted in FIG. 50 differs from the flowchart depicted in FIG. 37 in that step S237 is adopted.

The transfer destination determination unit 1105 identifies a socket for the client terminal, which corresponds to a socket for the application server, which is the transmission source of the response message in the socket association table 1115 (step S235 in FIG. 50).

The path control unit 1108 determines whether or not data requesting the release of the connection is contained in the header of the response message (step S237). When data requesting the release of the connection is not contained in the header of the response message (step S237: NO route), the path control unit 1108 maintains the connection. Accordingly, the processing proceeds to step S241. When data requesting the release of the connection is contained in the header of the response message (step S237: YES route), the path control unit 1108 deletes an entry with respect to the association between the socket for the client terminal identified at the step S235 and the socket for the application server from the socket association table 1115 (step S239).

The transfer destination determination unit 1105 then determines whether the transfer mode is "entrance" (step S241). When the transfer mode is not "entrance" (step S241: NO route), the processing proceeds to step S249.

When the transfer mode is "entrance" (step S241: YES route), the path control unit 1108 identifies the entry number of the entry deleted at the step S239 in an entry number list of the status management table 1114 (step S243). Specifically, the path control unit 1108 identifies, in the status management table 1114, an entry number list corresponding to a label included in the entry deleted at the step S239 and identifies the relevant entry number in the identified entry number list. The path control unit 1108 then deletes the entry number identified at the step S243 from the entry number list of the status management table 1114 (step S245). Since the steps S243 and S245 are performed only when the step S239 is performed, the blocks of steps the S243 and S245 are depicted by dotted lines in FIG. 50.

When no entry number is left in the entry number list due to the deletion of the entry number at step S239 and the path status in the status management table 1114 is "wait for detection of disuse", the path control unit 1108 detects that the path has gone out of use. The path control unit 1108 then transmits disuse detection notification representing that a path to which a label corresponding to the entry number list was assigned has gone out of use, to the control server 23 (step S247). When the path has not gone out of use, the step S247 is not performed. Accordingly, the block of the step S247 is depicted by a dotted line in FIG. 50.

The transmission unit 1102 then transfers the response message through the socket for the client terminal, which was identified at the step S235 (step S249). After that, the processing ends.

As a result, the performance of the relay processing performed by the relay apparatus can be enhanced compared to where the relay apparatus updates the socket association table 1115 whenever receiving a response message.

Although the embodiments were explained above, this technology is not limited to those. For example, the functional block configurations of the aforementioned control server 23, entrance relay apparatus 11, midway relay apparatuses 12 and 14, exit relay apparatus 13 and insertion servers 21 and 22 may not correspond to program module configurations.

Moreover, table configurations described above are mere examples, and may be changed. Furthermore, as long as the processing results do not change, the arrangement of the steps may be changed or plural steps may be executed in parallel.

Figure 51:
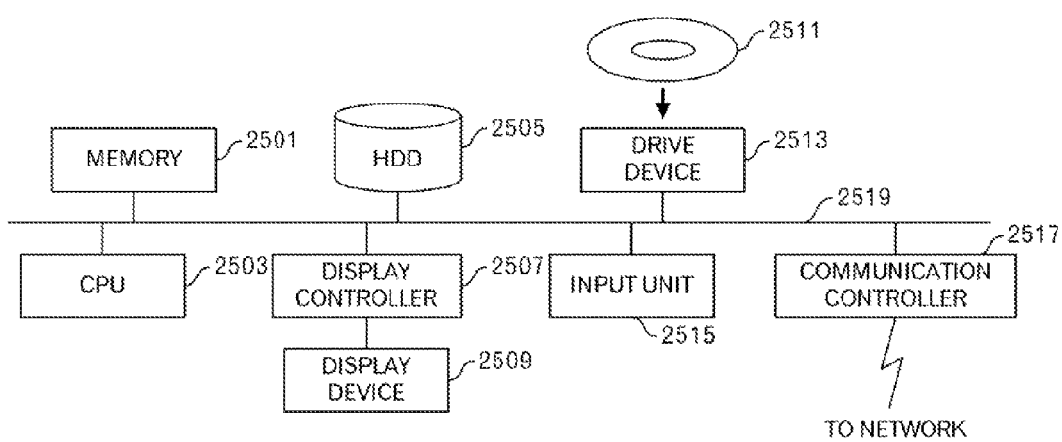
FIG. 51 is a functional block diagram of a computer.

In addition, the aforementioned control server 23, authentication server 24, client terminals 31 and 32 and application server 41 are computer devices as illustrated in FIG. 51. That is, a memory 2501 (storage device), a CPU 2503 (processor), a hard disk drive (HDD) 2505, a display controller 2507 connected to a display device 2509, a drive device 2513 for a removable disk 2511, an input device 2515, and a communication controller 2517 for connection with a network are connected through a bus 2519 as illustrated in FIG. 51. An operating system (OS) and an application program for carrying out the foregoing processing in the embodiment, are stored in the HDD 2505, and when executed by the CPU 2503, they are read out from the HDD 2505 to the memory 2501. As the need arises, the CPU 2503 controls the display controller 2507, the communication controller 2517, and the drive device 2513, and causes them to perform necessary operations. Besides, intermediate processing data is stored in the memory 2501, and if necessary, it is stored in the HDD 2505. In this embodiment of this technique, the application program to realize the aforementioned functions is stored in the computer-readable, non-transitory removable disk 2511 and distributed, and then it is installed into the HDD 2505 from the drive device 2513. It may be installed into the HDD 2505 via the network such as the Internet and the communication controller 2517. In the computer as stated above, the hardware such as the CPU 2503 and the memory 2501, the OS and the necessary application programs systematically cooperate with each other, so that various functions as described above in details are realized.

Figure 52:
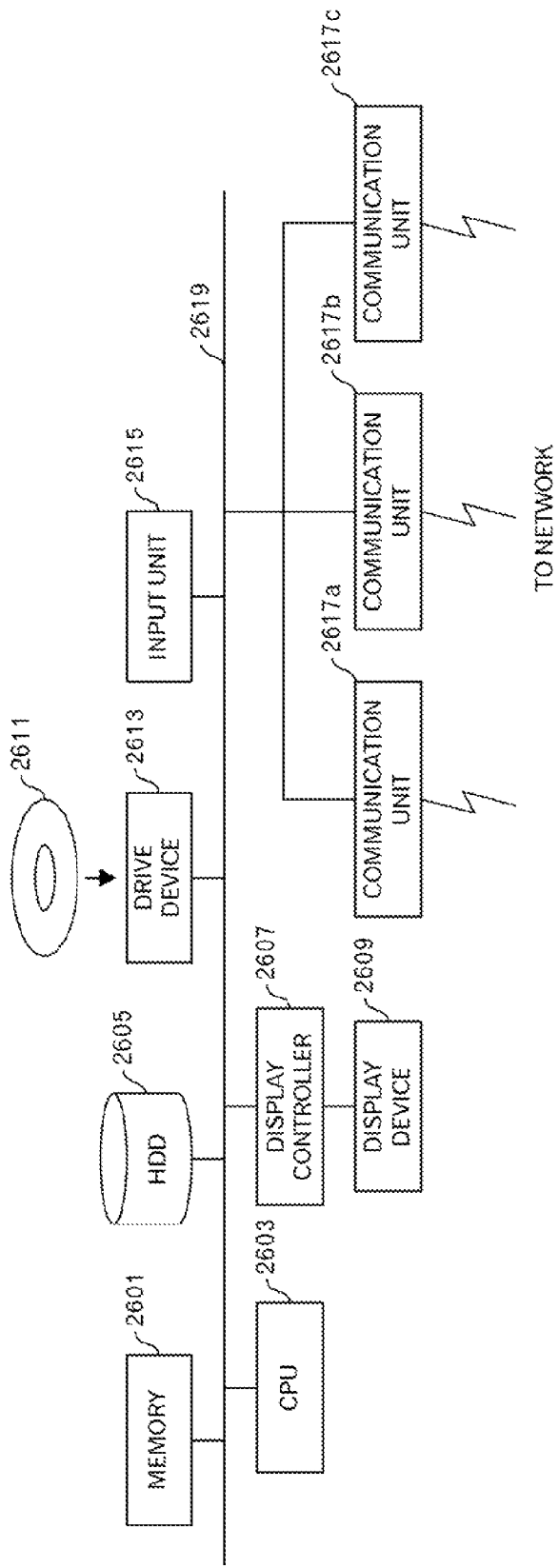
FIG. 52 is a functional block diagram of a relay apparatus when the relay apparatus is implemented by a computer.

In addition, in each of the aforementioned relay apparatuses, as illustrated in FIG. 52, a memory 2601, CPU 2603, Hard Disk Drive (HDD) 2605, display controller 2607 to be coupled with a display device 2609, drive device 2613 for a removable disk 2611, input device 2615 and communication units 2617 (2617a to 2617c in FIG. 52) for coupling to a network are coupled with a bus 2619. Incidentally, according to circumstances, the display controller 2607, display device 2609, drive device 2613 and input device 2615 may not be included. The OS and application programs for carrying out a processing in these embodiments are stored in the HDD 2605, and read out from the HDD 2605 to the memory 2601 when being executed by the CPU 2603. If necessary, the CPU 2603 controls the display controller 2607, communication unit 2617 and drive device 2613 to carry out necessary operations. Incidentally, data that was inputted through any one of the communication units 2617 is outputted through another communication unit 2617. The CPU 2603 controls the communication units 2617 to appropriately switch output destinations. In addition, data during the processing is stored in the memory 2601, and stored in the HDD 2605 if necessary. In the embodiments of this technique, the application programs for carrying out the aforementioned processing are distributed by a computer-readable removable disk 2611 storing the application programs, and the application programs are installed into the HDD 2605 through the drive device 2613.

The application programs may be installed into the HDD 2605 through the communication unit 2617 and the network such as the Internet. Such a computer apparatus realizes the aforementioned various functions by cooperating the hardware such as the CPU 2603, memory 2601 and the like with the OS and the application programs if necessary.

The embodiments described above are summarized as follows:

A relay apparatus relating to a first aspect of the embodiments includes: (A) a first data storage unit storing identification information of a communication in association with a label that is assigned to a path in the communication; (B) a second data storage unit storing a label in association with information of a transfer destination; (C) a storing processing unit that, upon receipt of a change request that is a request to change a path in a first communication and includes a label assigned to a path after the change and information of a transfer destination after the change from a computer managing a communication path, stores the label assigned to the path after the change in association with the information of the transfer destination after the change into the second data storage unit; (D) an update unit that updates the first data storage unit so as to change a first label assigned to a path before the change in the first communication to the label assigned to the path after the change; and (E) a deletion unit that, upon determining that response messages for a request message transferred on the path before the change have been received without omission with respect to the first communication, deletes the first label assigned to the path before the change and information of a transfer destination corresponding to the first label from the second data storage unit.

In this way, when the path of the communication in which the path for the request message and the path for the response message are required to be the same is changed, the resources associated with the path before the change can be released, early.

Moreover, the aforementioned relay apparatus may further include a third data storage unit that stores information of a socket to transfer a request message in association with information of a socket to transfer a response message. Then, upon receipt of a response message, the aforementioned deletion unit may delete information of a first socket with which the response message was received and information of a second socket, which is stored in association with the first socket from the third data storage unit. By doing so, it can be ensured that the path for the request message and the path for the response message actually becomes the same. Moreover, information of the socket associated with the path before the change becomes deleted, early.

Furthermore, the aforementioned deletion unit may count the number of request messages that were transferred on the path before the change and the number of response messages for the request messages, and may determine based on the counted number of request messages and the counted number of response messages, whether or not the response messages for the request messages transferred on the path before the change have been received without omission. In this way, it becomes possible to appropriately determine whether or not the response messages for the request message transferred on the old path have been received without omission. For example, when the number of request messages coincides with the number of response messages, it may be determined that the response messages for the request message transferred on the path before the change have been received without omission.

The aforementioned relay apparatus may further include a buffer. Then, upon receipt of a buffering request from the computer, the aforementioned deletion unit may cause request messages in the first communication, which are received after the buffering request, to be stored in the buffer, and may count the number of request messages in the first communication, which were received before the buffering request. By temporarily stopping the transfer of the request messages, the number of response messages can be appropriately counted.

In addition, upon receipt of information concerning increase or decrease of the number of request messages in the first communication or the number of response messages in the first communication from a computer, the aforementioned deletion unit may correct the number of request messages transferred in the path before the change or the number of response messages for the request message by using the information concerning the increase or decrease. For example, when filtering or copying of the message is carried out on the path, the number of request messages does not always coincide with the number of response messages. Therefore, by correcting in this way, an appropriate processing can be carried out for such a case.

Moreover, upon detecting that data included in a specific portion of a response message represents a last response message of plural response messages for one request message, the aforementioned deletion unit may determine that the plural response messages for the one request message have been received without omission. For example, it becomes possible to cope with such a case where plural response messages are transmitted for one request message.

In addition, upon detecting that a predetermined time elapsed after a request message was transferred on the path before the change, the aforementioned deletion unit may determine that the response messages for the request message have been received without omission. When any failure occurs in a transmission source apparatus of the response message, for example, the response message may not return. Then, by doing so, it becomes possible to avoid such a situation that the resources associated with the path before the change cannot be released because some response messages do not return.

Furthermore, the aforementioned deletion unit may extract information of a transfer destination corresponding to the label assigned to the path before the change from the second data storage unit, and may transmit a message to request deletion of data concerning the first label assigned to the path before the change to the transfer destination identified by the extracted information. Thus, even in other relay apparatuses on the path before the change, it becomes possible to early release the resources associated with the path before the change.

In addition, upon receipt of a response message including data representing release of a connection is requested, the aforementioned deletion unit may delete information of a third socket with which the response message was received and information of a fourth socket, which is stored in association with the third socket from the third data storage unit. Thus, it is possible to utilize data stored in the third data storage unit until the release of the connection is explicitly requested.

A path control apparatus relating to a second aspect of the embodiments includes: (A) a first transmission unit that, upon accepting an input of information of a path after change in a first communication, transmits a label assigned to the path after the change and information of a transfer destination after the change to relay apparatuses on the path after the change; (B) a second transmission unit that transmits a determination request to determine whether or not response messages for a request message transferred on a path before the change have been received without omission to a first relay apparatus that is a relay apparatus nearest to an apparatus that is a transmission source of the request message among the relay apparatuses on the path after the change; and (C) a third transmission unit that, upon receipt of first data representing the response messages for the request message transferred on the path before the change have been received without omission from the first relay apparatus, transmits a deletion request to request deletion of data concerning resources associated with a label assigned to the path before the change in the first communication to at least the first relay apparatus.

Thus, when changing the path of the communication for which the path of the request message and the path of the response message are required to be the same, it becomes possible to early release the resources associated with the path before the change.

In addition, the aforementioned second transmission unit may transmit a buffering request to request buffering of request messages in the first communication to the first relay apparatus. Then, upon receipt of the first data, the aforementioned third transmission unit may transmit a restart request to request restart of transfer of the buffered request messages in the first communication to the first relay apparatus. Thus, because the transfer of the request messages in the first communication can be temporarily stopped, it becomes possible to appropriately determine whether or not the response messages for the request message have been received without omission.

Furthermore, the aforementioned third transmission unit may further transmit the deletion request to relay apparatuses other than the first relay apparatus among relay apparatuses on the path before the change. Thus, the apparatus on the path before the change can release the resource associated with the path before the change, early.

An information processing system relating to a third aspect of the embodiments includes: (A) a relay apparatus; and (B) a path control apparatus managing a communication path. The aforementioned relay apparatus includes: (a1) a first data storage unit storing identification information of a communication in association with a label that is assigned to a path in the communication; (a2) a second data storage unit storing a label in association with information of a transfer destination; and (a3) a processing unit. Then, upon accepting an input of information of a path after change in a first communication, the path control apparatus transmits a change request that includes a label assigned to the path after the change and information of a transfer destination after the change to at least the relay apparatus. Moreover, upon receipt of the change request from the path control apparatus, the processing unit of the relay apparatus carries out a processing to store the label assigned to the path after the change in association with the information of the transfer destination after the change into the second data storage unit, and transmits data representing that the processing to store has been completed to the path control apparatus. Upon receipt of the data representing that the processing to store has been completed from at least the relay apparatus, the path control apparatus transmits a path change request including identification information of the first communication, a label assigned to a path before the change in the first communication and a label assigned to the path after the change to at least the relay apparatus. Upon receipt of the path change request from the path control apparatus, the processing unit of the relay apparatus updates the first data storage unit so as to change the label assigned to the path before the change in the first communication to the label assigned to the path after the change.

Upon determining that response messages for a request message transferred on the path before the change have been received without omission with respect to the first communication, the processing unit of the relay apparatus transmits disuse notification representing disuse of the path before the change to the path control apparatus. Upon receipt of the disuse notification, the path control apparatus transmits a deletion request to request deletion of data concerning resources associated with the label assigned to the path before the change in the first communication to at least the relay apparatus. Upon receipt of the deletion request, the processing unit of the relay apparatus deletes the label assigned to the path before the change in the first communication and information of a transfer destination corresponding to the label assigned to the path before the change from the second data storage unit.

Thus, when the path of the communication for which the path for the request message and the path for the response message are required to be the same is changed, the resources associated with the path before the change can be released, early.

Incidentally, it is possible to create a program causing a computer to execute the aforementioned processing, and such a program is stored in a computer readable storage medium or storage device such as a flexible disk, CD-ROM, DVD-ROM, magneto-optic disk, a semiconductor memory, and hard disk. In addition, the intermediate processing result is temporarily stored in a storage device such as a main memory or the like.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. A relay apparatus, comprising:
a first data storage unit storing identification information of a communication in association with a label that is assigned to a path in the communication;
a second data storage unit storing a label in association with information of a transfer destination;
a storing processing unit that, upon receipt of a change request that is a request to change a path in a first communication and includes a label assigned to a path after the change and information of a transfer destination after the change from a computer managing a communication path, stores the label assigned to the path after the change in association with the information of the transfer destination after the change into the second data storage unit;
an update unit that updates the first data storage unit so as to change a first label assigned to a path before the change in the first communication to the label assigned to the path after the change; and
a deletion unit that, upon determining that response messages for a request message transferred on the path before the change have been received without omission with respect to the first communication, deletes the first label assigned to the path before the change and information of a transfer destination corresponding to the first label from the second data storage unit.

2. The relay apparatus as set forth in claim 1, further comprising:
  a third data storage unit that stores information of a socket to transfer a request message in association with information of a socket to transfer a response message, and
  wherein, upon receipt of a response message, the deletion unit deletes information of a first socket with which the response message was received and information of a second socket, which is stored in association with the first socket from the third data storage unit.

3. The relay apparatus as set forth in claim 1, wherein the deletion unit counts a number of request messages that were transferred on the path before the change and a number of response messages for the request messages, and determines based on the counted number of request messages and the counted number of response messages, whether or not the response messages for the request messages transferred on the path before the change have been received without omission.

4. The relay apparatus as set forth in claim 3, further comprising a buffer, and
  wherein, upon receipt of a buffering request from the computer, the deletion unit causes request messages in the first communication, which are received after the buffering request, to be stored in the buffer, and counts a number of request messages in the first communication, which were received before the buffering request.

5. The relay apparatus as set forth in claim 3, wherein, upon receipt of information concerning increase or decrease of the number of request messages in the first communication or the number of response messages in the first communication, the deletion unit corrects the number of request messages transferred in the path before the change or the number of response messages for the request message by using the information concerning the increase or decrease.

6. The relay apparatus as set forth in claim 1, wherein, upon detecting that data included in a specific portion of a response message represents a last response message of plural response messages for one request message, the deletion unit determines that the plural response messages for the one request message have been received without omission.

7. The relay apparatus as set forth in claim 1, wherein, upon detecting that a predetermined time elapsed after a request message was transferred on the path before the change, the deletion unit determines that the response messages for the request message have been received without omission.

8. The relay apparatus as set forth in claim 1, wherein the deletion unit extracts information of a transfer destination corresponding to the label assigned to the path before the change from the second data storage unit, and transmits a message to request deletion of data concerning the first label assigned to the path before the change to the transfer destination identified by the extracted information.

9. The relay apparatus as set forth in claim 2, wherein, upon receipt of a response message including data representing release of a connection is requested, the deletion unit deletes information of a third socket with which the response message was received and information of a fourth socket, which is stored in association with the third socket from the third data storage unit.

10. A path control apparatus, comprising:
  a first transmission unit that, upon accepting an input of information of a path after change in a first communication, transmits a label assigned to the path after the change and information of a transfer destination after the change to relay apparatuses on the path after the change;
  a second transmission unit that transmits a determination request to determine whether or not response messages for a request message transferred on a path before the change have been received without omission to a first relay apparatus that is a relay apparatus nearest to an apparatus that is a transmission source of the request message among the relay apparatuses on the path after the change; and
  a third transmission unit that, upon receipt of first data representing the response messages for the request message transferred on the path before the change have been received without omission from the first relay apparatus, transmits a deletion request to request deletion of data concerning resources associated with a label assigned to the path before the change in the first communication to at least the first relay apparatus.

11. The path control apparatus as set forth in claim 10, wherein the second transmission unit transmits a buffering request to request buffering of request messages in the first communication to the first relay apparatus, and
  upon receipt of the first data, the third transmission unit transmits a restart request to request restart of transfer of the buffered request messages in the first communication to the first relay apparatus.

12. The path control apparatus as set forth in claim 10, wherein the third transmission unit further transmits the deletion request to relay apparatuses other than the first relay apparatus among relay apparatuses on the path before the change.

13. A computer-readable, non-transitory storage medium storing a program for causing a computer to execute a procedure, the procedure comprising:
  upon receipt of a change request that is a request to change a path in a first communication and includes a label assigned to a path after the change and information of a transfer destination after the change from a second computer managing a communication path, storing the label assigned to the path after the change in association with the information of the transfer destination after the change into a first data storage unit storing a label in association with information of a transfer destination;
  updating a second data storage unit so as to change a first label assigned to a path before the change in the first communication to the label assigned to the path after the change, wherein the second data storage unit storing identification information of a communication in association with a label that is assigned to a path in the communication; and
  upon determining that response messages for a request message transferred on the path before the change have been received without omission with respect to the first communication, deleting the first label assigned to the path before the change and information of a transfer destination corresponding to the first label from the first data storage unit.

14. An information processing method, comprising:
  upon receipt of a change request that is a request to change a path in a first communication and includes a label assigned to a path after the change and information of a transfer destination after the change from a second computer managing a communication path, storing, by using a computer, the label assigned to the path after the change in association with the information of the transfer destination after the change into a first data storage unit storing a label in association with information of a transfer destination;

updating, by using the computer, a second data storage unit so as to change a first label assigned to a path before the change in the first communication to the label assigned to the path after the change, wherein the second data storage unit stores identification information of a communication in association with a label that is assigned to a path in the communication; and upon determining that response messages for a request message transferred on the path before the change have been received without omission with respect to the first communication, deleting, by using the computer, the first label assigned to the path before the change and information of a transfer destination corresponding to the first label from the first data storage unit.

15. A computer-readable, non-transitory storage medium storing a program for causing a computer to execute a procedure, comprising:

upon accepting an input of information of a path after change in a first communication, transmitting a label assigned to the path after the change and information of a transfer destination after the change to relay apparatuses on the path after the change;

transmitting a determination request to determine whether or not response messages for a request message transferred on a path before the change have been received without omission to a first relay apparatus that is a relay apparatus nearest to an apparatus that is a transmission source of the request message among the relay apparatuses on the path after the change; and upon receipt of first data representing the response messages for the request message transferred on the path before the change have been received without omission from the first relay apparatus, transmitting a deletion request to request deletion of data concerning resources associated with a label assigned to the path before the change in the first communication to at least the first relay apparatus.

16. An information processing method, comprising:

upon accepting an input of information of a path after change in a first communication, transmitting, by using a computer, a label assigned to the path after the change and information of a transfer destination after the change to relay apparatuses on the path after the change;

transmitting, by using the computer, a determination request to determine whether or not response messages for a request message transferred on a path before the change have been received without omission to a first relay apparatus that is a relay apparatus nearest to an apparatus that is a transmission source of the request message among the relay apparatuses on the path after the change; and upon receipt of first data representing the response messages for the request message transferred on the path before the change have been received without omission from the first relay apparatus, transmitting, by using the computer, a deletion request to request deletion of data concerning resources associated with a label assigned to the path before the change in the first communication to at least the first relay apparatus.

17. An information processing system, comprising:

a relay apparatus; and a path control apparatus managing a communication path, wherein the relay apparatus comprises:

a first data storage unit storing identification information of a communication in association with a label that is assigned to a path in the communication;

a second data storage unit storing a label in association with information of a transfer destination; and a processing unit, and upon accepting an input of information of a path after change in a first communication, the path control apparatus transmits a change request that includes a label assigned to the path after the change and information of a transfer destination after the change to at least the relay apparatus, upon receipt of the change request from the path control apparatus, the processing unit of the relay apparatus carries out a processing to store the label assigned to the path after the change in association with the information of the transfer destination after the change into the second data storage unit, and transmits data representing that the processing to store has been completed to the path control apparatus, upon receipt of the data representing that the processing to store has been completed from at least the relay apparatus, the path control apparatus transmits a path change request including identification information of the first communication, a label assigned to a path before the change in the first communication and a label assigned to the path after the change to at least the relay apparatus, upon receipt of the path change request from the path control apparatus, the processing unit of the relay apparatus updates the first data storage unit so as to change the label assigned to the path before the change in the first communication to the label assigned to the path after the change, upon determining that response messages for a request message transferred on the path before the change have been received without omission with respect to the first communication, the processing unit of the relay apparatus transmits disuse notification representing disuse of the path before the change to the path control apparatus, upon receipt of the disuse notification, the path control apparatus transmits a deletion request to request deletion of data concerning resources associated with the label assigned to the path before the change in the first communication to at least the relay apparatus, and upon receipt of the deletion request, the processing unit of the relay apparatus deletes the label assigned to the path before the change in the first communication and information of a transfer destination corresponding to the label assigned to the path before the change from the second data storage unit.

* * * * *